(12) United States Patent
Yamakage et al.

(10) Patent No.: US 6,741,723 B2
(45) Date of Patent: May 25, 2004

(54) DIGITAL WATERMARK EMBEDDING METHOD AND APPARATUS, AND DIGITAL WATERMARK

(75) Inventors: Tomoo Yamakage, Yokohama (JP); Hirofumi Muratani, Kawasaki (JP); Hisashi Yamada, Yokohama (JP); Toru Kambayashi, Chigasaki (JP); Shinichiro Koto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/327,072

(22) Filed: Dec. 24, 2002

(65) Prior Publication Data

US 2003/0091213 A1 May 15, 2003

Related U.S. Application Data

(63) Continuation of application No. PCT/JP02/04083, filed on Apr. 24, 2002.

(30) Foreign Application Priority Data

Apr. 24, 2001 (JP) ........................................ 2001-126748

(51) Int. Cl.[7] ................................................. H04K 1/00
(52) U.S. Cl. ...................................................... 382/100
(58) Field of Search ............................... 382/100, 232; 380/210, 252, 287, 54; 713/176

(56) References Cited

U.S. PATENT DOCUMENTS

| | | | | |
|---|---|---|---|---|
| 5,940,135 A | | 8/1999 | Petrovic et al. ............. | 348/473 |
| 6,111,990 A | * | 8/2000 | Sugaya et al. ............... | 382/250 |
| 6,145,081 A | * | 11/2000 | Winograd et al. ........... | 713/200 |
| 6,185,312 B1 | * | 2/2001 | Nakamura et al. .......... | 382/100 |
| 6,427,012 B1 | * | 7/2002 | Petrovic ....................... | 382/238 |
| 2002/0034224 A1 | * | 3/2002 | Srinivasan .................. | 375/240 |

FOREIGN PATENT DOCUMENTS

| | | | | |
|---|---|---|---|---|
| EP | 1 022 678 A2 | * | 7/2000 | ............. G06T/1/00 |
| EP | 1 087 377 A1 | * | 3/2001 | ............. G10L/11/00 |
| JP | 11-98341 A | | 4/1999 | ........... H04N/1/387 |
| JP | 2000-32406 A | | 1/2000 | ............ H04N/7/08 |
| JP | 2000-217088 A | | 8/2000 | ............ H04N/7/08 |

OTHER PUBLICATIONS

Cox et al., "Secure Spread Spectrum Watermarking for Multimedia," *NEC Research Institute, Technical Report 95–10*, Dec. 1995, pp. 1–33.*

Ó Ruanaidh et al., "Phase Watermarking of Digital Images," *Proc. Int. Conf. on Image Processing (vol. III)*, Sep. 1996, pp. 239–242.*

Huang et al., "Embedding Strategy for Image Watermarking in DCT Domain," *Proceedings APCC/OECC '99*, Oct. 1999, pp. 981–984.*

Alturki et al., "An Oblivious Robust Digital Watermark Technique for Still Images Using DCT Phase Modulation," *Proc. IEEE Int. Conf. on Acoustics, Speech, and Signal Processing*, Jun. 2000, pp. 1975–1978.*

(List continued on next page.)

*Primary Examiner*—Andrew W. Johns
(74) *Attorney, Agent, or Firm*—Oblon, Spivak, McClelland, Maier & Neustadt, P.C.

(57) ABSTRACT

A specific frequency extraction unit extracts a specific frequency component signal from an input image signal, a phase controller and amplitude controller control at least one of the phase and amplitude of the specific frequency component signal in accordance with watermark information, and a watermark information superposition unit superposes the specific frequency component signal on the input image signal to generate an image signal embedded with the watermark information.

5 Claims, 23 Drawing Sheets

OTHER PUBLICATIONS

Kazuki Takeuchi, et al. "A Proposal of Video Edit Detection Sytem by Digital Wartermarking of Video Contents Characteristic Information" Jan. 1999, The 1999 Symposium on Cryptography and Information Security Kobe Japan pp. 331–336.

Takao Nakamura et al. "An Improvement of Watermark Robustness Against Moving and/or Cropping the area of the Image" Jan. 1999, The 1999 Symposium on Cryptography and Information Security Kobe Japan pp. 193–198.

Hyuncheol Park, et al. "Visible Watermarking using Verifiable Digital Seal Image" Jan. 2001, The 2001 Symposium on Cryptography and Information Security Kobe Japan pp. 103–108.

J. Fridrich, et al. "Images with Self–Correcting Capabilities" [Online] Proceedings of the IEEE International Conference on Image Processing, Kobe Japan, Oct. 1999.

J. P. Linnartz, et al. "Analysis of the Sensitivity Attack against Electronic Watermarks in Images" [Online] Proc. of the $2^{nd}$ Information Hiding Workshop, Portland, Oregon, Apr. 15–17, 1998.

Jiri Fridrich. "Methods for Tamper Detection in Digital Images" [Online] Proceedings of Multimedia and Security Workshop at ACM Multimedia, 1999.

Marc Schneider, et al. "A Robust Content Based Digital Signature for Image Authentication" [Online] In Proceedings of the 1996 IEEE International Conference on Image Processing, Lausanne, Switzerland, Sep. 1996.

W. Bender et al., "Techniques for Data Hiding" IBM System Journal, vol. 35 Nos 3&4, 1996, pp. 313–336.

* cited by examiner

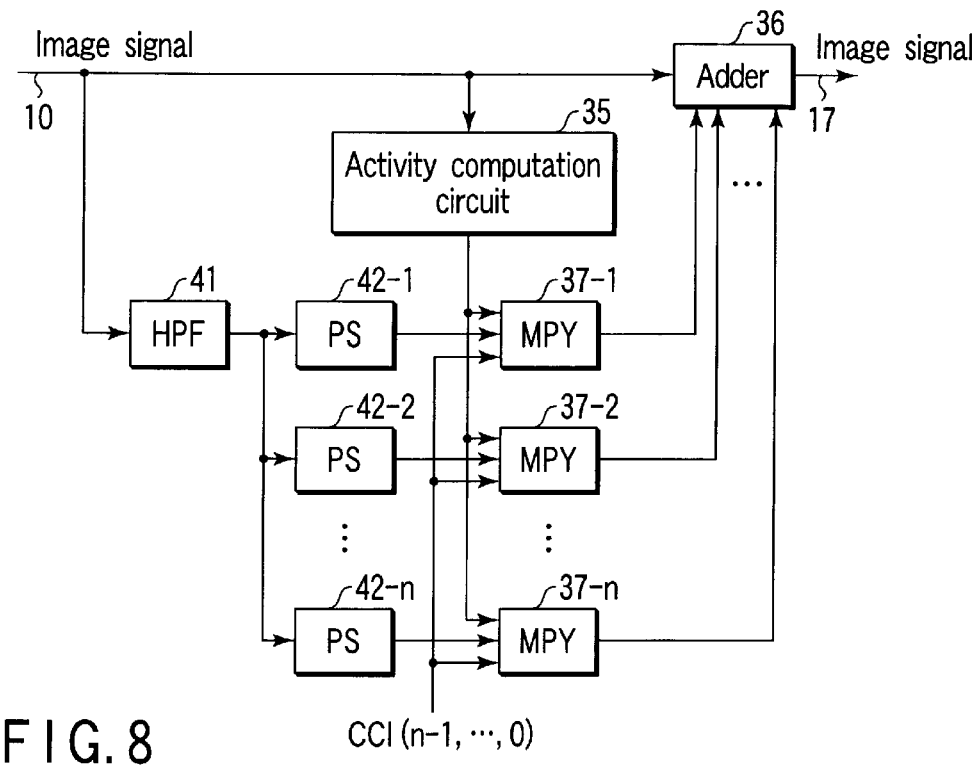
F I G. 8
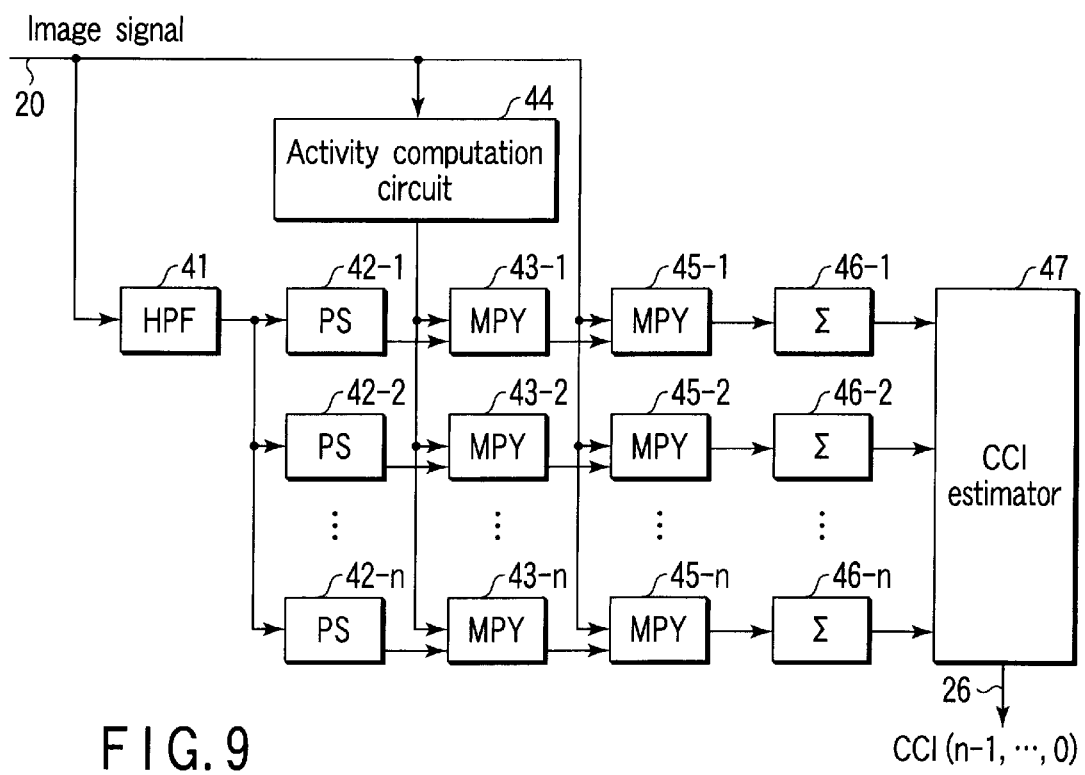
F I G. 9

(a) Embedded image signal
(b) Specific frequency component signal
(c) Phase shift signal
(d) Phase shift signal (a) Line N
(b) Phase shift signal
(c) Phase shift signal 2
(d) Embedded image signal (a) Line N+1
(b) Phase shift signal 1
(c) Phase shift signal 2
(d) Embedded image signal

| | | | | |
|---|---|---|---|---|
| −1 | −1 | 0 | 0 | 0 |
| −1 | 0 | 0 | 0 | 1 |
| −1 | +1 | 0 | 1 | 0 |
| 0 | −1 | 0 | 1 | 1 |
| 0 | 0 | 1 | 0 | 0 |
| 0 | +1 | 1 | 0 | 1 |
| +1 | −1 | 1 | 1 | 0 |
| +1 | 0 | 1 | 1 | 1 |
| +1 | +1 | Not used | Not used | Not used |

| | | | | |
|---|---|---|---|---|
| −1 | −1 | 0 | 0 | 0 |
| −1 | 0 | 0 | 0 | 1 |
| −1 | +1 | 0 | 1 | 0 |
| 0 | −1 | 0 | 1 | 1 |
| 0 | 0 | forbidden | forbidden | forbidden |
| 0 | +1 | 1 | 0 | 0 |
| +1 | −1 | 1 | 0 | 1 |
| +1 | 0 | 1 | 1 | 0 |
| +1 | +1 | 1 | 1 | 1 |

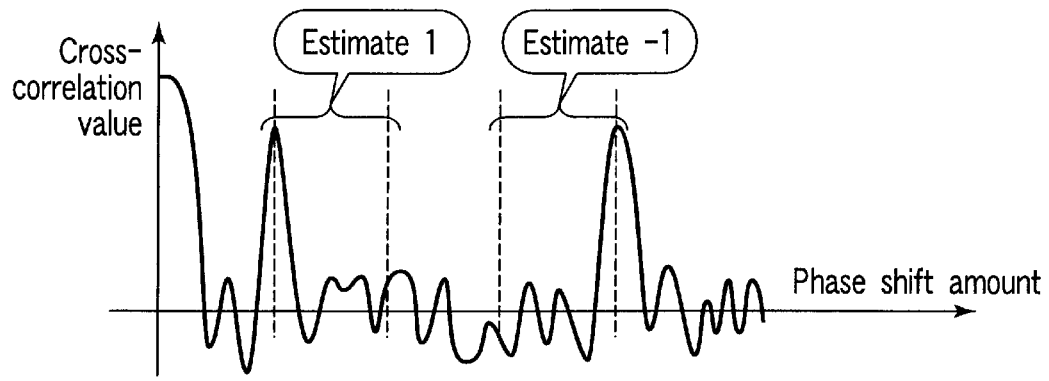
F I G. 29
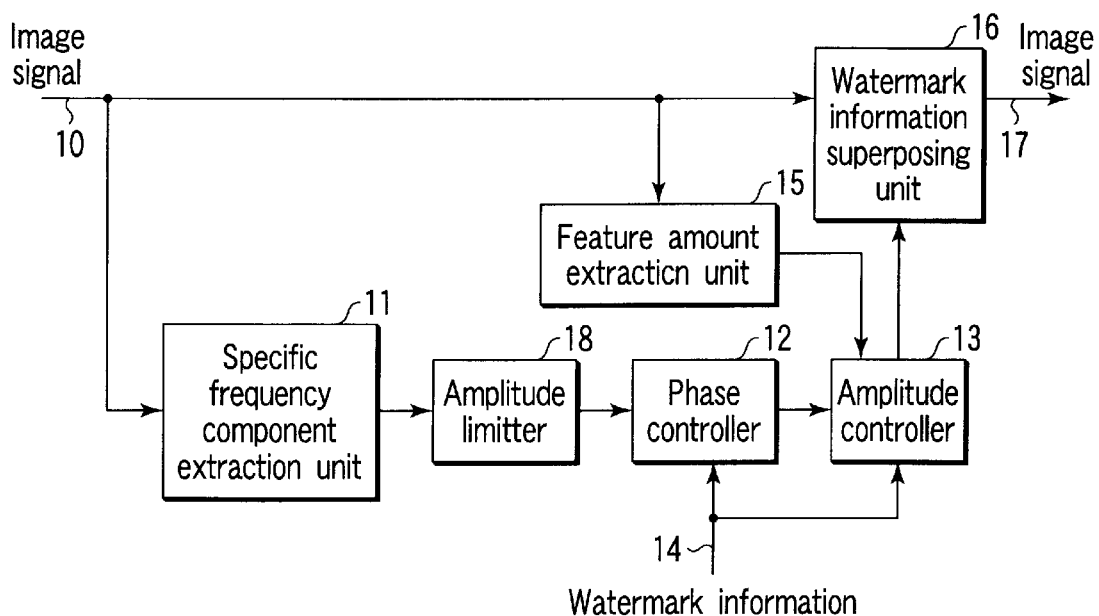
F I G. 30

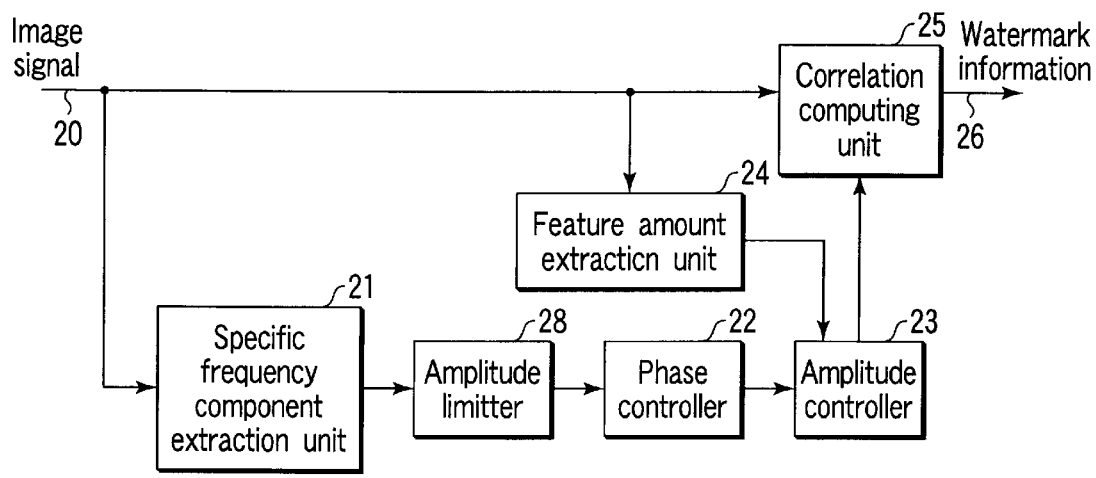
F I G. 31
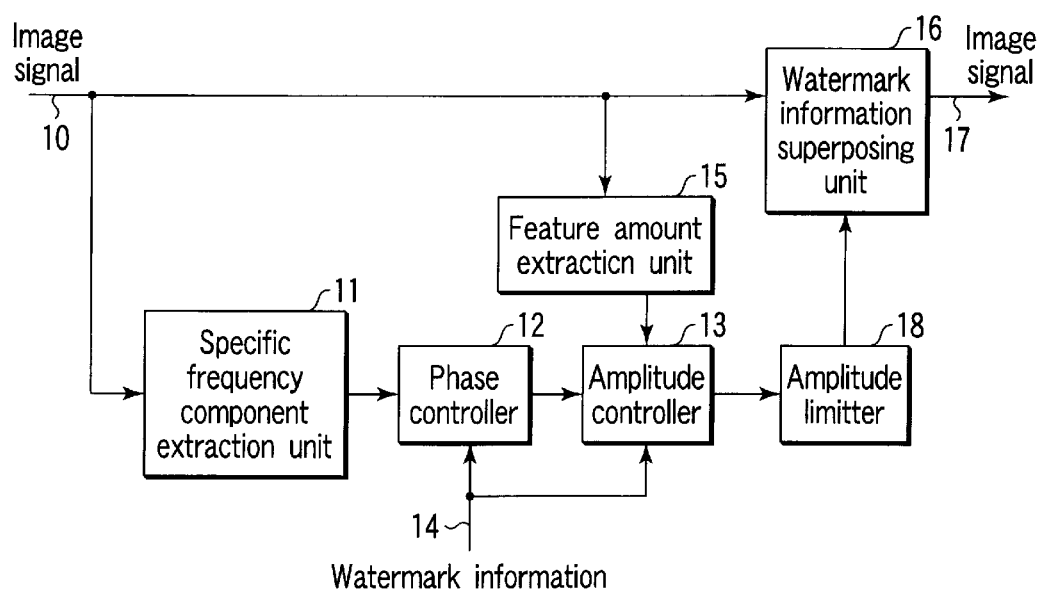
F I G. 32

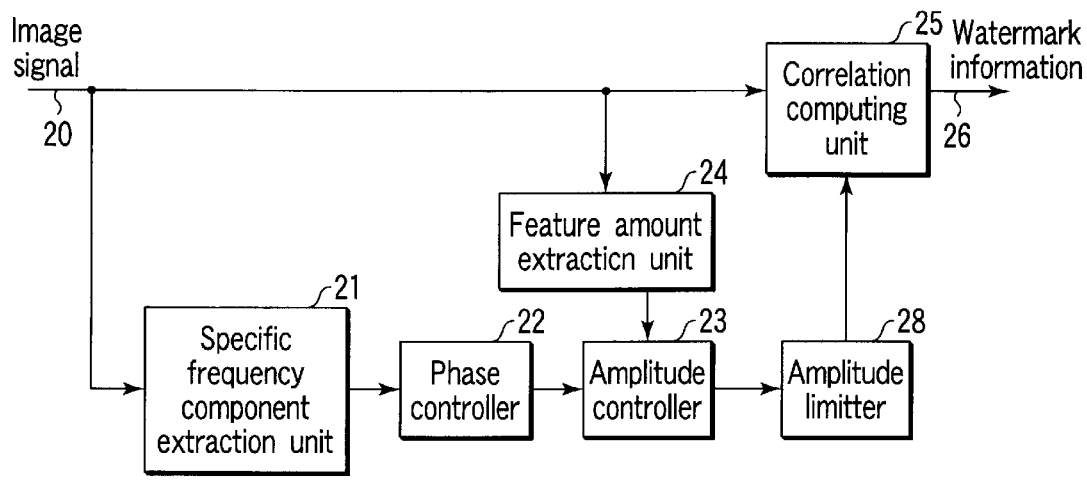
F I G. 33
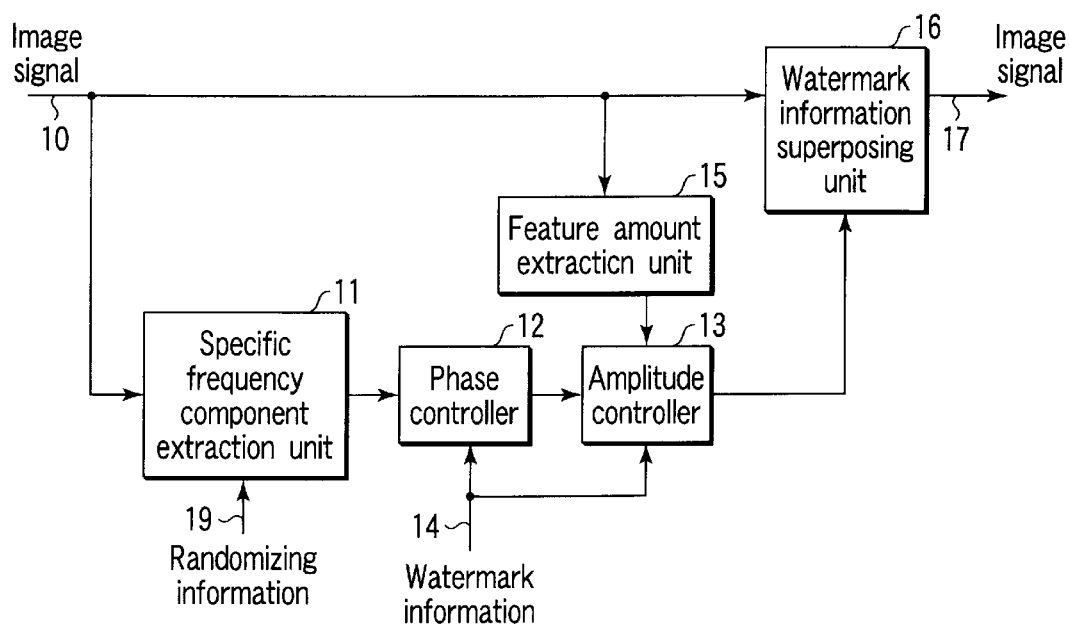
F I G. 34

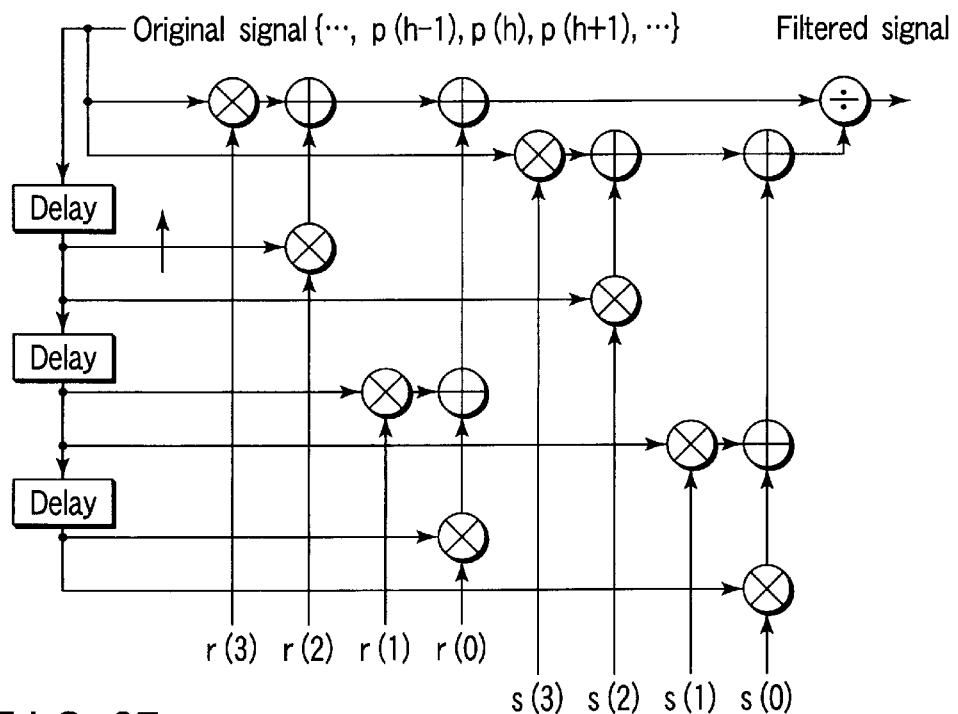
F I G. 37
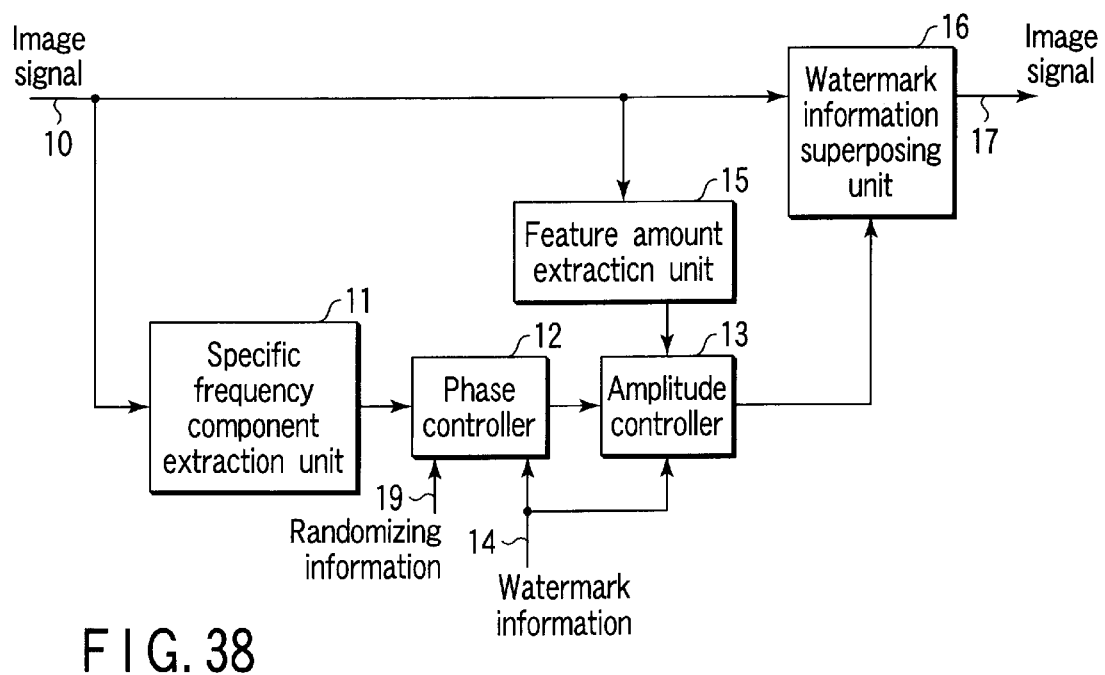
F I G. 38

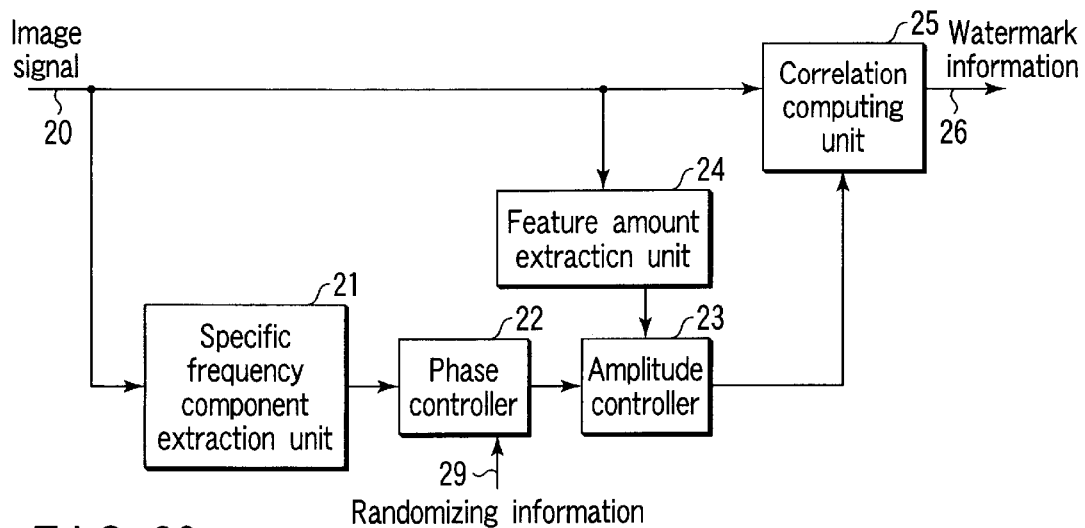
F I G. 39
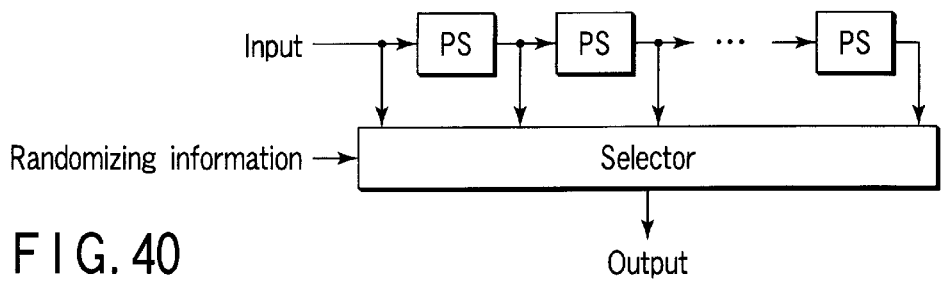
F I G. 40
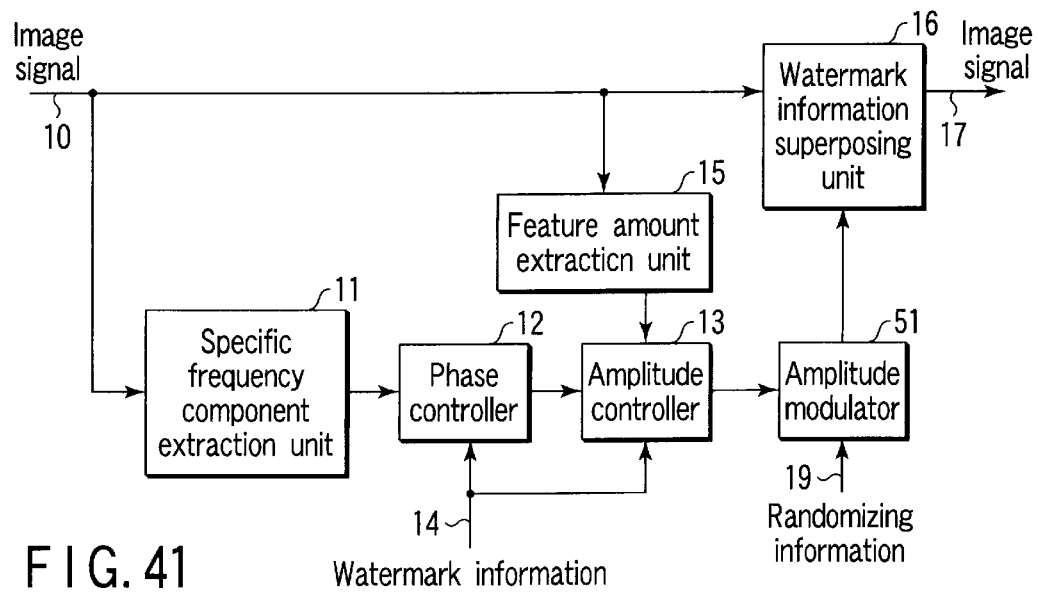
F I G. 41

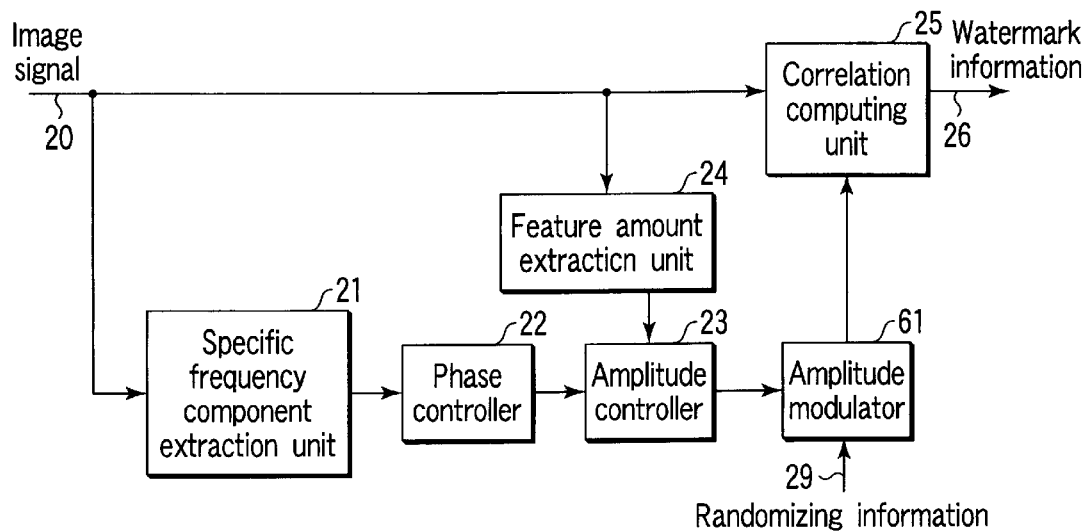
F I G. 42
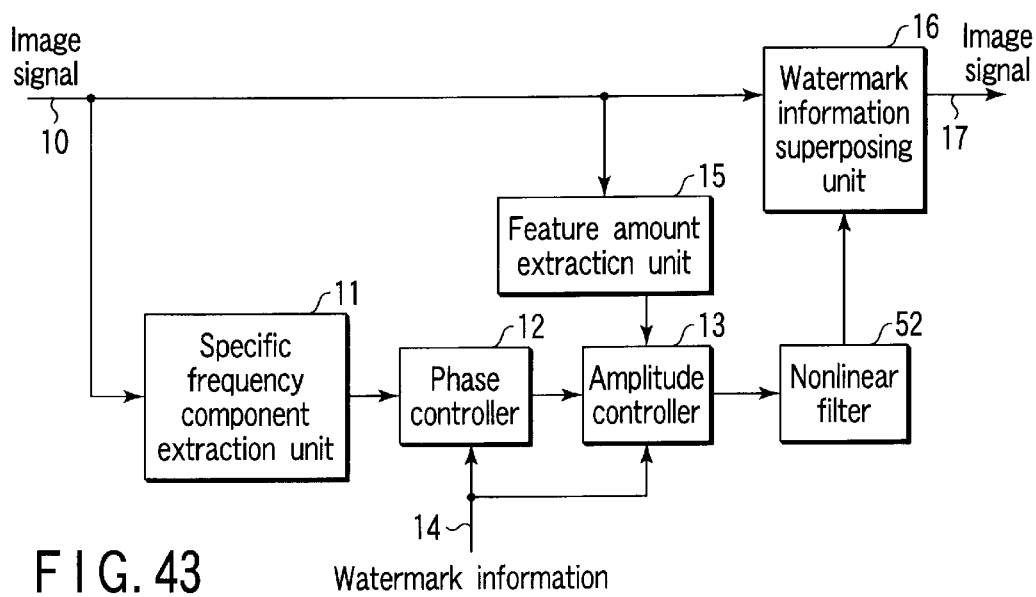
F I G. 43

DIGITAL WATERMARK EMBEDDING METHOD AND APPARATUS, AND DIGITAL WATERMARK

CROSS-REFERENCE TO RELATED APPLICATIONS

This is a Continuation Application of PCT Application No. PCT/JP02/04083, filed Apr. 24, 2002, which was not published under PCT Article 21(2) in English.

This application is based upon and claims the benefit of priority from the prior Japanese Patent Application No. 2001-126748, filed Apr. 24, 2001; the entire contents of which are incorporated herein by reference.

BACKGROUND OF THE INVENTION

1. Field of the Invention

The present invention relates to a digital watermark embedding method and apparatus, and a digital watermark detection method and apparatus, which are effective in preventing illegal copies of a digital moving image signal provided via, e.g., recording media.

2. Description of the Related Art

As apparatuses for recording and playing back digital image data, such as a digital VTR, DVD (Digital Versatile Disk), and the like have prevailed, the number of digital moving images that can be played back by these apparatuses are provided. Various digital moving images are distributed via digital television broadcast via the Internet, broadcast satellite, communication satellite, and the like, enabling users to enjoy high-quality digital moving images.

It is easy to form high-quality copies from digital moving images on the digital signal level. Therefore, if some copy protection or copy control is not applied to digital moving images, there is the danger of unrestricted formation of copies of digital images. Therefore, illicit copies of digital images must be prevented, and the number of generations of copies formed by authorized users must be restricted. For this purpose, a method of appending information for copy control to each digital moving image, and preventing illicit copies or restricting copies has been proposed.

As a technique for superposing additional information to a digital moving image in such a way, digital watermarking is known. In digital watermarking, information such as identification information of the copyright owner or user of contents, right information of the copyright owner, use conditions of contents, secret information required upon using contents, the aforementioned copy control information, or the like (such information will be referred to as watermark information hereinafter) is embedded in contents of audio data, music data, moving image data, still image data, or the like, which has been converted into digital data, so as not to be easy to perceive. By detecting the embedded watermark information from the contents later as needed, copyright protection, including use control and copy control, can be achieved, and further use of the contents is possible.

As a conventional method of digital watermarking, a method that applies a spread spectrum technique is known. In this method, watermark information is embedded in a digital moving image in the following sequence.

In a first step, an image signal undergoes spread spectrum by being multiplied by a PN (Pseudorandom Noise) sequence.

In a second step, the image signal after spread spectrum undergoes frequency transformation (e.g., DCT transformation).

In a third step, watermark information is embedded in the image signal by changing the values of specific frequency components.

In a fourth step, the image signal undergoes inverse frequency transformation (e.g., IDCT transformation).

In a fifth step, the image signal undergoes inversely spread spectrum (the image signal is multiplied by the same PN sequence as in the first step).

Watermark information is detected in the following sequence, from the digital moving image, in which the watermark information has been embedded in the above sequence.

In a sixth step, the image signal undergoes spread spectrum by being multiplied by a PN (Pseudorandom Noise) sequence (the same PN sequence as in the first step).

In a seventh step, the image signal after spread spectrum undergoes frequency transformation (e.g., DCT transformation).

In an eighth step, the embedded watermark information is extracted from the image signal while paying attention to the values of specific frequency components.

When digital watermarking is applied to digital productions for the purpose of prevention of illicit use, a characteristic (robustness) that can prevent watermark information from being lost or tampered with, and deliberate attacks which are normally carried out on digital productions must be provided to digital watermarking. As attacks that make the watermark information of a digital image impossible to detect, cut-out, scaling (enlargement/reduction), rotation, and the like of an image are known.

When an image that has suffered such attacks is input, the conventional technique recovers synchronization of a PN sequence by executing a process for estimating a PN sequence used in the first step at the time of embedding upon detection of watermark information. After that, the processes in the sixth through eighth steps are executed to extract the embedded watermark information. However, in order to recover synchronization of the PN sequence from the image signal alone, a search must be conducted by trying a process for detecting watermark information using a plurality of candidates of PN sequences and adopting a candidate that can be detected satisfactory. For this purpose, problems of increases in arithmetic operation volume and circuit scale are posed. After that, the processes in steps D1 to D3 are executed to extract the embedded watermark information. However, in order to recover synchronization of the PN sequence from the image signal alone, a search must be conducted by trying a process for detecting watermark information using a plurality of candidates of PN sequences and adopting a candidate that can be detected satisfactory. For this purpose, problems of increases in arithmetic operation volume and circuit scale are posed.

It is an object of the present invention to provide a digital watermark embedding method and apparatus, and a digital watermark detection method and apparatus, which can detect embedded watermark information against attacks such as cut-out, scaling, rotation, and the like of an image, without increasing the arithmetic operation volume and circuit scale.

BRIEF SUMMARY OF THE INVENTION

The first aspect of the present invention provides a digital watermark embedding method for embedding watermark information in an image signal, comprising the steps of: extracting a specific frequency component signal from an input image signal; controlling at least one of a phase and amplitude of the specific frequency component signal in accordance with watermark information; and outputting an image signal embedded with the watermark information by superposing the specific frequency component signal, at least one of the phase and amplitude of which has been controlled, on the input image signal.

The second aspect of the present invention provides a digital watermark detection method comprising the steps of: extracting a specific frequency component signal from an input image signal in which watermark information is embedded; controlling at least one of a phase and amplitude of the extracted specific frequency component signal; and extracting the watermark information by making a correlation operation between the specific frequency component signal which has undergone at least one of phase control and amplitude control, and the input image signal.

The third aspect of the present invention provides a digital watermark embedding apparatus comprising: extraction means for extracting a specific frequency component signal from an input image signal; control means for controlling at least one of a phase and amplitude of the extracted specific frequency component signal in accordance with watermark information; and superposing means for superposing the specific frequency component signal, at least one of the phase and amplitude of which has been controlled by the control means, on the input image signal so as to output an image signal embedded with the watermark information.

The fourth aspect of the present invention provides a digital watermark detection apparatus comprising the steps of: extraction means for extracting a specific frequency component signal from an input image signal in which watermark information is embedded; control means for controlling at least one of a phase and amplitude of the extracted specific frequency component signal; and correlation computing means for extracting the watermark information by making a correlation operation between the specific frequency component signal, at least one of the phase and amplitude of which has been controlled by the control means, and the input image signal.

BRIEF DESCRIPTION OF THE SEVERAL VIEWS OF THE DRAWING

FIG. 8 is a block diagram showing another example of a detailed arrangement of the digital watermark embedding apparatus according to the embodiment of the present invention;

FIG. 9 is a block diagram showing an example of a detailed arrangement of the digital watermark detection apparatus according to the embodiment of the present invention;

FIG. 29 is a graph showing the watermark information detection operation in the digital watermark detection apparatus shown in FIG. 3 when watermark information (1, −1) is embedded depending on whether or not to superpose a specific frequency component signal, which has undergone fixed phase shift by four phase shifters, in the digital watermark embedding apparatus shown in FIG. 1;

FIG. 30 is a block diagram showing the basic arrangement of a digital watermark embedding apparatus using an amplitude limiter according to an embodiment of the present invention;

FIG. 31 is a block diagram showing the basic arrangement of a digital watermark detection apparatus using an amplitude limiter according to the embodiment of the present invention;

FIG. 32 is a block diagram showing the basic arrangement of a digital watermark embedding apparatus using an amplitude limiter according to an embodiment of the present invention;

FIG. 33 is a block diagram showing the basic arrangement of a digital watermark detection apparatus using an amplitude limiter according to the embodiment of the present invention;

FIG. 34 is a block diagram showing the basic arrangement of a digital watermark embedding apparatus using randomizing information according to an embodiment of the present invention;

FIG. 37 is a block diagram showing another example of the detailed arrangement of a specific frequency component extraction unit in FIGS. 34 and 35;

FIG. 38 is a block diagram showing the basic arrangement of a digital watermark embedding apparatus using randomizing information according to an embodiment of the present invention;

FIG. 39 is a block diagram showing the basic arrangement of a digital watermark detection apparatus using randomizing information according to the embodiment of the present invention;

FIG. 40 is a block diagram showing an example of the detailed arrangement of a phase controller shown in FIGS. 38 and 39;

FIG. 41 is a block diagram showing the basic arrangement of a digital watermark embedding apparatus using randomizing information according to an embodiment of the present invention;

FIG. 42 is a block diagram showing the basic arrangement of a digital watermark detection apparatus using randomizing information according to the embodiment of the present invention;

FIG. 43 is a block diagram showing the basic arrangement of a digital watermark embedding apparatus using randomizing information according to an embodiment of the present invention;

DETAILED DESCRIPTION OF THE INVENTION

Figure 1:
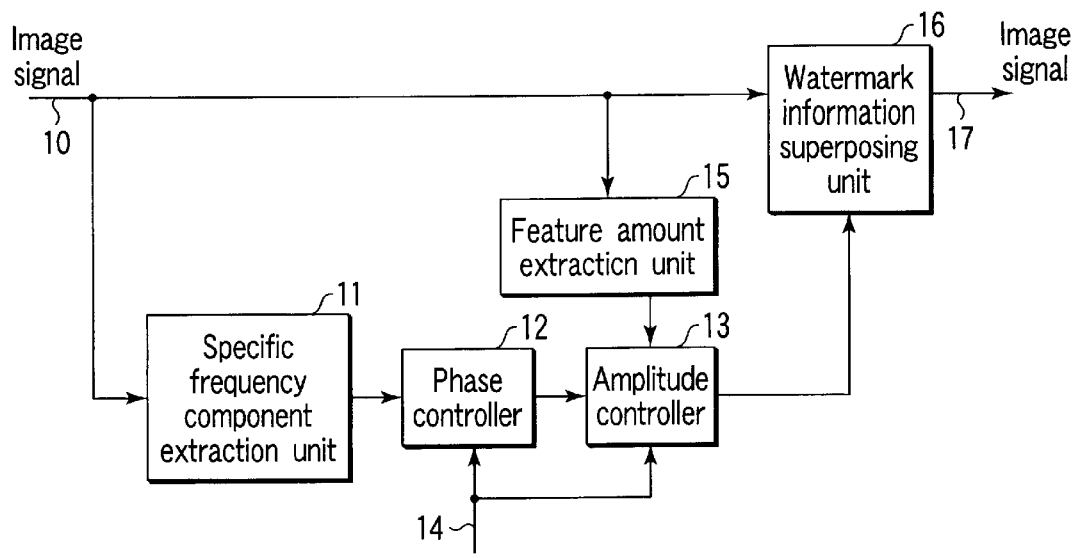
FIG. 1 is a block diagram showing the basic arrangement of a digital watermark embedding apparatus according to an embodiment of the present invention.

Embodiments of the present invention will be described hereinafter with reference to the accompanying drawings.
First Embodiment
Basic Arrangement of Digital Watermark Embedding Apparatus FIG. 1 is a block diagram showing the basic arrangement of a digital watermark embedding apparatus according to an embodiment of the present invention. The digital watermark embedding apparatus receives an image signal obtained by converting a moving image or still image into digital data as an image signal (to be referred to as a to-be-watermarked image signal hereinafter) 10 in which watermark information is to be embedded. This to-be-watermarked image signal 10 may contain both a luminance signal and color difference signals but may contain a luminance signal alone.

The to-be-watermarked image signal 10 is branched into three paths, and is input to a specific frequency component extraction unit 11, feature amount extraction unit 15, and watermark information superposition unit 16. The specific frequency component extraction unit 11 comprises a digital filter of the frequency domain, e.g., a bandpass filter having a predetermined cutoff frequency or a bandpass filter having a predetermined passband center frequency, and extracts a specific frequency component, e.g., a relatively high frequency component, from the input moving image signal. In the following description, the output signal from the specific frequency component extraction unit 11 will be referred to as a specific frequency component signal.

The phase and amplitude of the specific frequency component signal output from the specific frequency component extraction unit 11 are controlled by a phase controller 12 and amplitude controller 13. In this embodiment, the phase controller 12 is arranged at the former stage, and the amplitude controller 13 is arranged at the latter stage. However, alternatively, the amplitude controller 13 may be arranged at the former stage, and the phase controller 12 may be arranged at the latter stage. Watermark information 14 as digital information to be embedded in the input image signal 10 is supplied to at least one of the phase controller 12 and amplitude controller 13.

Figure 2:
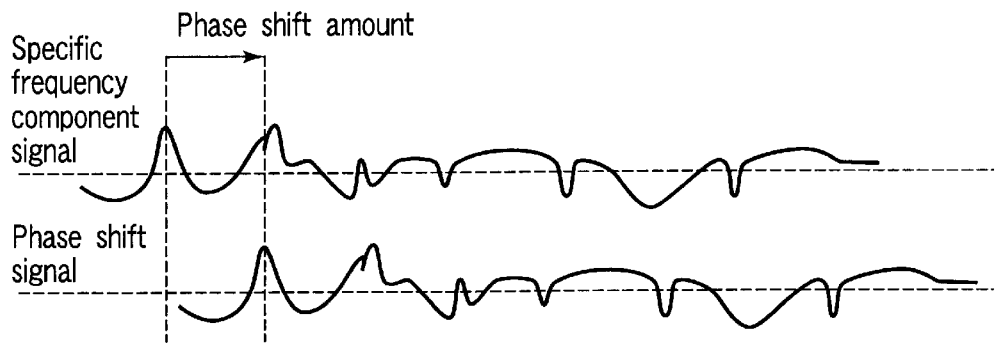
FIG. 2 is a chart for explaining phase shift of a specific frequency signal by a phase controller in the embodiment of the present invention.

The phase controller 12 is designed to subject the specific frequency component signal to phase control by a predetermined, unique phase control amount. More specifically, the phase controller 12 is implemented by one or a plurality of digital phase shifters, and the phase control amount corresponds to a phase shift amount of each phase shifter. FIG. 2 shows the phase shift process of the phase controller 12. In this example, the phase of the specific frequency component signal is simply shifted while maintaining its waveform. When the watermark information 14 is input to the phase controller 12, the phase control amount (phase shift amount) of the phase controller 12 is controlled in accordance with the watermark information 14.

The amplitude controller 13 is designed to subject the input specific frequency component signal to amplitude control by a predetermined, unique amplitude control amount. More specifically, the amplitude controller 13 comprises one or a plurality of EX-OR gates and digital multipliers, and the amplitude control amount corresponds to a coefficient to be multiplied by the input specific frequency component signal. When the watermark information 14 is input to the amplitude controller 13, the amplitude control amount (coefficient) of the amplitude controller 13 is controlled in accordance with the watermark information 14.

Furthermore, in this embodiment, the feature amount extraction unit 15 extracts a feature amount of the to-be-watermarked image signal 10, e.g., an activity that represents the complexity of an image. This feature amount information is input to the amplitude controller 13. The amplitude controller 13 controls the amplitude control amount (coefficient) of the specific frequency component in accordance with the input feature amount. More specifically, when the feature amount is an activity, a larger coefficient is set with increasing activity. Note that the feature amount extraction unit 15 is not indispensable, and may be omitted.

The specific frequency component signal is subjected to phase control and amplitude control by the phase controller 12 and amplitude controller 13. This specific frequency component signal is supplied as a watermarking signal and is superposed on the to-be-watermarked image signal 10 by the watermark information superposition unit 16 which comprises a digital adder. That is, the specific frequency component signal extracted by the specific frequency component extraction unit 11 is subjected to phase control and amplitude control unique to the digital watermark embedding apparatus by the phase controller 12 and amplitude controller 13, and one or both the phase control amount and amplitude control amount are controlled in accordance with the watermark information 14. For this reason, the watermark information superposition unit 16 embeds the watermark information 14 in the to-be-watermarked image signal 10. Note that the specific frequency component extraction unit 11 may extract a plurality of channels of specific frequency components, and the phase controller 12 and amplitude controller 13 may control the phases and amplitudes of the plurality of channels of specific frequency components to generate a plurality of channels of specific frequency component signals. In such a case, the plurality of channels of specific frequency component signals are superposed on the to-be-watermarked image signal 10 by the watermark information superposition unit 16.

An image signal (to be referred to as a watermarked image signal hereinafter) 17 in which the watermark information has been embedded in this way is recorded on a recording medium by a digital image recording/playback apparatus such as a DVD system or the like, or is transmitted via a transmission medium such as the Internet, broadcast satellite, communication satellite, or the like.

Basic Arrangement of Digital Watermark Detection Apparatus

The basic arrangement of a digital watermark detection apparatus corresponding to the digital watermark embedding apparatus shown in FIG. 1 will be explained below using FIGS. 3 and 4.

Figure 3:
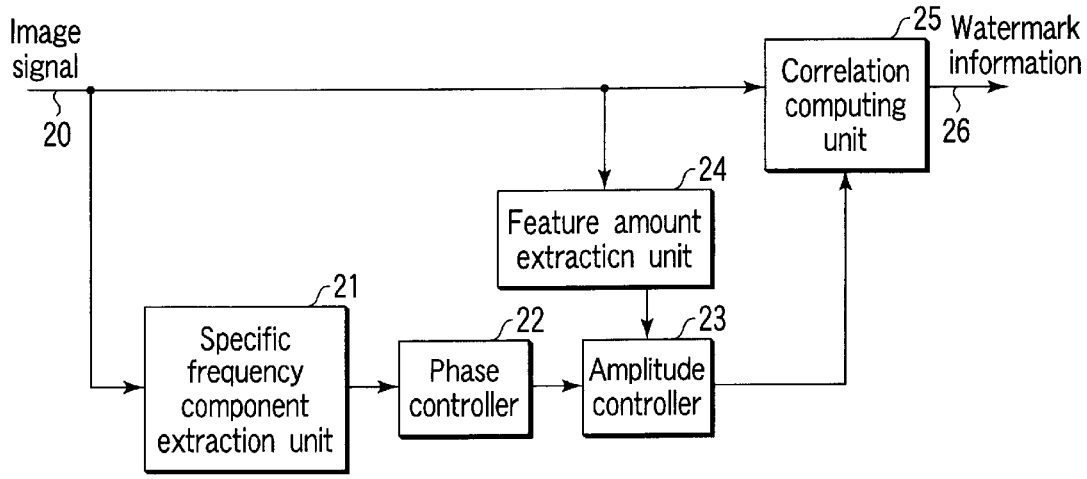
FIG. 3 is a block diagram showing the basic arrangement of a digital watermark detection apparatus according to the embodiment of the present invention.

The digital watermark detection apparatus in FIG. 3 receives the watermarked image signal 17 generated by the digital watermark embedding apparatus shown in FIG. 1 as an input watermarked image signal 20 via a recording medium or transmission medium. This watermarked image signal 20 is branched into three paths, and is input to a specific frequency component extraction unit 21, a feature amount extraction unit 24, and one input of a correlation computation unit 25.

The specific frequency component extraction unit 21 comprises the same high-pass filter (HPF) or low-pass filter (LPF) as that in the specific frequency component extraction unit 11 used in the digital watermark embedding apparatus shown in FIG. 1.

The specific frequency component extraction unit 21 extracts the same specific frequency component as that extracted from the watermarked image signal 10 of the watermarked image signal 20, by the specific frequency component extraction unit 11.

The phase and amplitude of the specific frequency component signal output from the specific frequency component extraction unit 21 are controlled by a phase controller 22 and amplitude controller 23. In this embodiment, the phase controller 22 is arranged at the former stage, and the amplitude controller 23 is arranged at the latter stage. However, alternatively, the amplitude controller 23 may be arranged at the former stage, and the phase controller 22 may be arranged at the latter stage.

The phase controller 22 is designed to subject the specific frequency component signal to phase control by a predetermined, unique phase control amount. More specifically, the phase controller 22 is implemented by a digital phase shifter, as will be described later. The same phase control amount (phase shift amount) as that given by the phase controller 12 used in the digital watermark embedding apparatus shown in FIG. 1 is input to the phase controller 22.

The amplitude controller 23 multiplies the specific frequency component signal by a coefficient corresponding to a feature amount extracted by the feature amount extraction unit 24 from the watermarked image signal 20, e.g., the activity representing the complexity of an image.

The specific frequency component signal, the phase and amplitude of which have been controlled by the phase controller 22 and amplitude controller 23, is input to the other input of the correlation computation unit 25. This correlation computation unit 25 makes a correlation (more specifically, cross-correlation) operation between the specific frequency component signal and watermarked image signal 20, and detects embedded watermark information 26. That is, upon observing a change in cross-correlation value with respect to the phase shift amount, a peak appears at the position of the phase shift amount corresponding to the phase control amount of the phase controller 22, and the polarity of this peak represents watermark information. The peak of the cross-correlation value assumes either a positive or negative value in correspondence with watermark information. For example, if the peak is positive, it is determined that the watermark information is "1"; if the peak is negative, it is determined that the watermark information is "0". In this way, the correlation computation unit 25 outputs determined watermark information 26.

Figure 4:
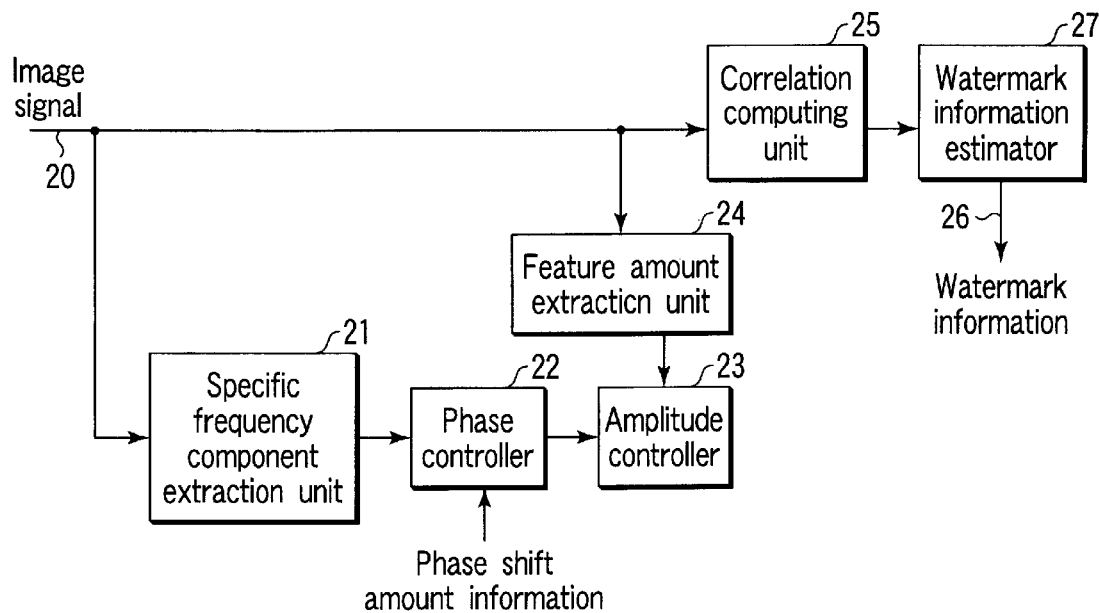
FIG. 4 is a block diagram showing another basic arrangement of a digital watermark detection apparatus according to the embodiment of the present invention.
Figure 5:
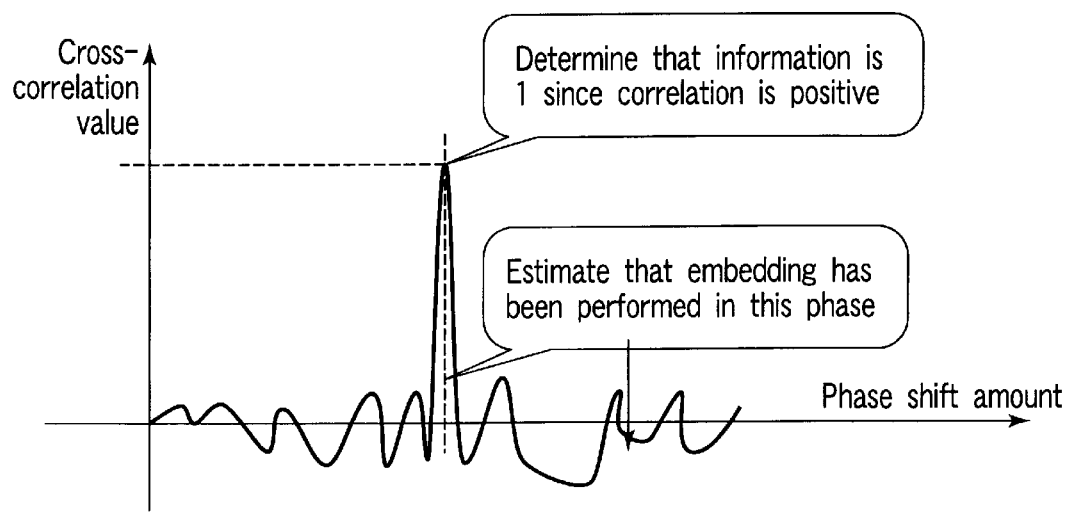
FIG. 5 is a graph showing an operation example of peak search for a cross-correlation value and watermark information detection in the digital watermark detection apparatus according to the embodiment of the present invention.

FIG. 4 shows a digital watermark detection apparatus obtained by modifying the digital watermark detection apparatus shown in FIG. 3. This digital watermark detection apparatus has an arrangement suitable for a case wherein the watermarked image signal 20 has suffered scaling. If the watermarked image signal 20 has suffered scaling, the phase shift amount of the specific frequency component signal assumes a value different from that given to the specific frequency component signal in the digital watermark embedding apparatus.

In this embodiment, the phase shift amount of the phase controller 22 is controlled continuously or step by step in accordance with phase shift amount information. Based on this, a watermark information estimator 27 arranged on the output side of the correlation computation unit 25 searches for a peak of the cross-correlation value output from the correlation computation unit 25, and estimates watermark information from the polarity of the found peak. In this example, since the cross-correlation value is positive, it is estimated (determined) that the watermark information is "1".

Figure 6:
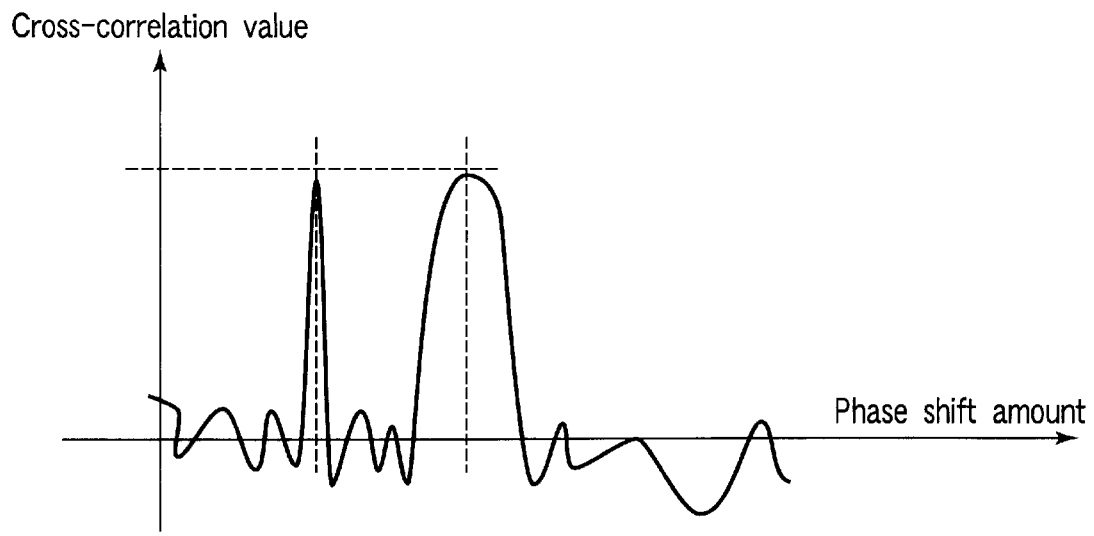
FIG. 6 is a graph showing an operation example of peak search for a cross-correlation value and watermark information detection in the digital watermark detection apparatus according to the embodiment of the present invention.

Assume that the digital watermark embedding apparatus shown in FIG. 1 uses a plurality of phase shifters of different phase shift amounts as the phase controller 12, as will be described later, and a plurality of amplitude control elements of the amplitude controller 13 are prepared in correspondence with these phase shifters. In such a case, the phase controller 22 in FIG. 3 or 4 may comprise a plurality of phase shifters. However, the phase controller 22 may comprise a single phase shifter that can vary its phase shift amount, and the watermark information estimator 27 may search for a peak of the cross-correlation value output from the correlation computation unit 25 while changing the phase shift amount in accordance with phase shift amount information, as shown in FIG. 4. In this case, a peak can be detected in correspondence with the phase shift amount of the phase shifter at the time of embedding the watermark information, as shown in FIG. 6, and each watermark can be estimated.

EXAMPLE 1
Detailed Arrangement of Digital Watermark Embedding Apparatus

Figure 7:
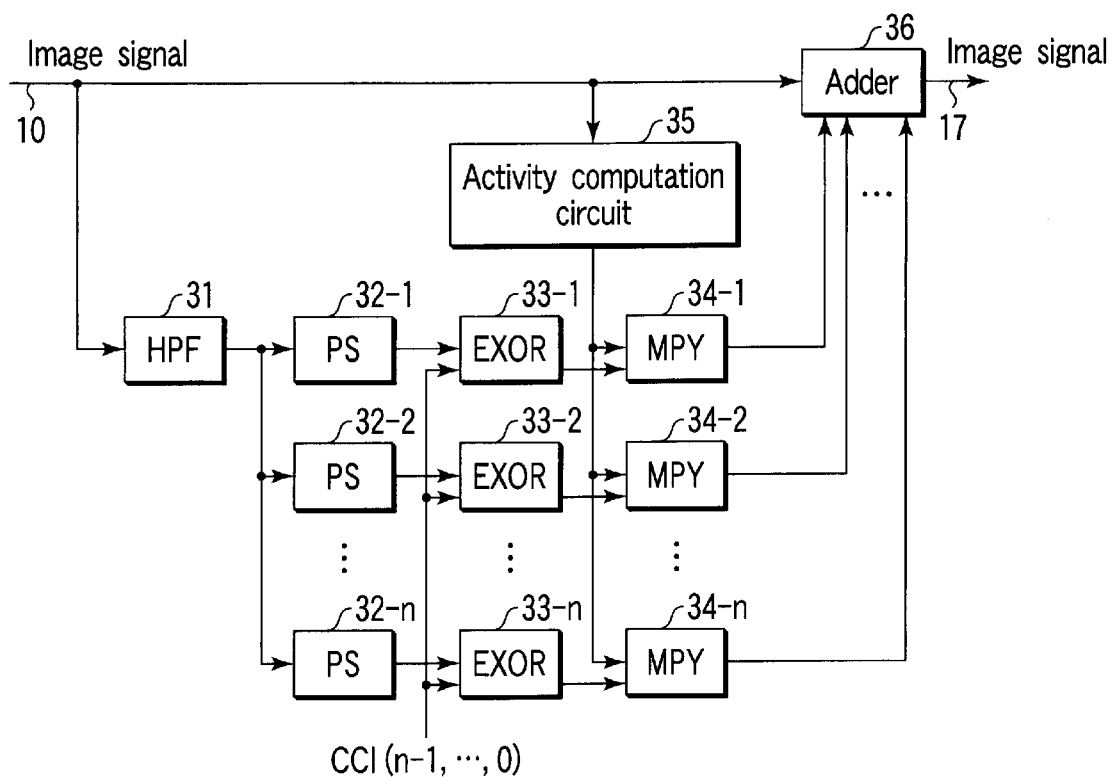
FIG. 7 is a block diagram showing an example of a detailed arrangement of the digital watermark embedding apparatus according to the embodiment of the present invention.

FIG. 7 shows a detailed embodiment of the digital watermark embedding apparatus according to the present invention. The correspondence with FIG. 1 that shows the basic arrangement of the digital watermark embedding apparatus will be explained below. A high-pass filter (HPF) 31, n phase shifters (PS) 32-1 to 32-n, n EXOR gates (EXOR) 33-1 to 33-n and multipliers (MPY) 34-1 to 34-n, an activity computation circuit 35, and a digital adder 36 respectively correspond to the specific frequency component extraction unit 11, phase controller 12, amplitude controller 13, feature amount extraction unit 15, and watermark information superposition unit 16.

A specific frequency component signal output from the high-pass filter 31 is subjected to phase shifts of predetermined different shift amounts by the phase shifters 32-1 to 32-n, and is then input to the inputs on one side of the EXOR gates 33-1 to 33-n. The inputs on the other side of the EXOR gates 33-1 to 33-n receive respective bits of n-bit watermark information 14 (CCI). The outputs from the EXOR gates 33-1 to 33-n are multiplied by an activity computed by the activity computation circuit 35 in the multipliers 34-1 to 34-n.

A watermarking signal as the outputs from the multipliers 34-1 to 34-n is added to the to-be-watermarked signal 10 by the adder 36, whereby the watermark information 14 in the to-be-watermarked signal 10 and the watermarked image signal 17 is generated.

EXAMPLE 2
Detailed Arrangement of Digital Watermark Embedding Apparatus

FIG. 8 shows a digital watermark embedding apparatus as a modification of FIG. 7. In this modification, 3-input multipliers (MPY) 37-1 to 37-n are used in place of the EXOR gates 33-1 to 33-n and multipliers 34-1 to 34-n in FIG. 7. The first inputs of the multipliers 37-1 to 37-n respectively receive the phase-shifted specific frequency component signal from the phase shifters 32-1 to 32-n. The second inputs receive respective bits of the n-bit watermark information 14 (CCI), and the third inputs commonly receive the activity computed by the activity computation circuit 35. With this arrangement as well, functions equivalent to those of the digital watermark embedding apparatus shown in FIG. 7 can be obtained.

EXAMPLE
Detailed Arrangement of Digital Watermark Detection Apparatus

FIG. 9 shows a digital watermark detection apparatus according to another embodiment of the present invention, and this detection apparatus corresponds to the digital watermark embedding apparatus shown in FIG. 7. The correspondence between the digital watermark detection apparatus in FIG. 9 and the basic arrangement of the digital watermark detection apparatus in FIG. 4 will be explained below. A high-pass filter 41 corresponds to the specific frequency component extraction unit 21, and n phase shifters (PS) 42-1 to 42-n correspond to the phase controller 22. Also, n first multipliers (MPY) 43-1 to 43-n correspond to the amplitude controller 23, and an activity computation circuit 44 corresponds to the feature amount extraction unit 24. Furthermore, n second multipliers (MPY) 45-1 to 45-n and cumulative adders 46-1 to 46-n correspond to the correlation computation unit 25, and a CCI estimator 47 corresponds to the watermark information estimator 27.

A specific frequency component signal output from the high-pass filter 41 is subjected to phase shifts of predetermined shift amounts, which are the same as those of the phase shifters 32-1 to 32-n in FIG. 7, by the phase shifters 42-1 to 42-n, and is then multiplied by the activity computed by the activity computation circuit 44 by the first multipliers 43-1 to 43-n.

The output signals from the first multipliers 43-1 to 43-n are multiplied by the watermarked image signal 20 by the second multipliers 45-1 to 45-n. The output signals from the second multipliers 45-1 to 45-n are cumulatively added by the cumulative adders 45-1 to 45-n, and are then input to the CCI estimator 47, which generates respective bits of watermark information 26 (CCI).

OPERATION EXAMPLE 1
Digital Watermark Embedding/Detection Apparatus

A practical operation example executed when the digital watermark embedding apparatus in FIG. 7 or 8 embeds 2-bit watermark information, and the digital watermark detection apparatus in FIG. 9 detects that watermark information will be explained below using FIGS. 10 to 12.

Figure 10:
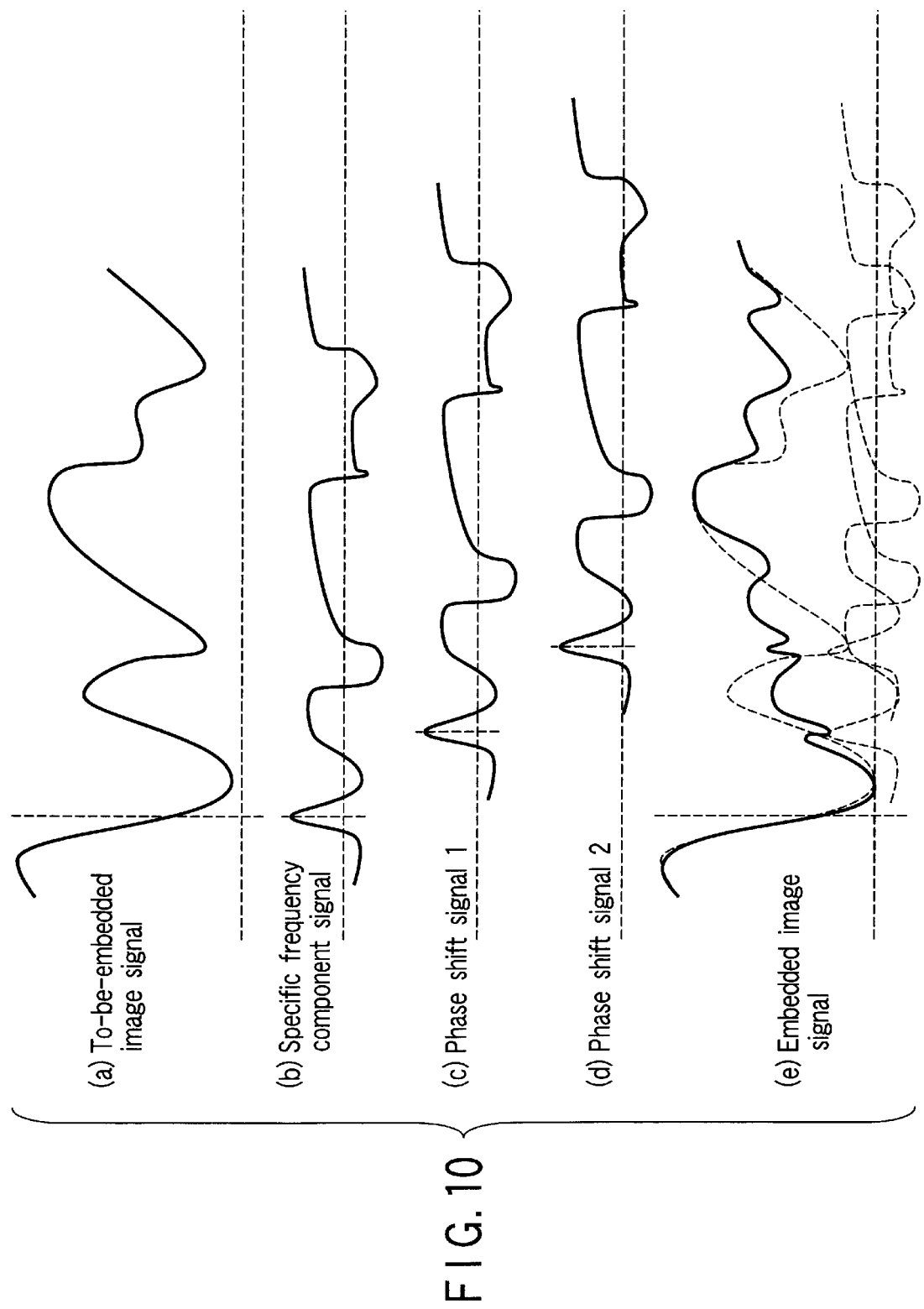
FIG. 10 is a waveform chart of respective signals, which shows the operation of the digital watermark embedding apparatus shown in FIG. 7 or 8.

In the digital watermark embedding apparatus in FIG. 7 or 8, the high-pass filter 31 extracts a specific frequency component signal indicated by (b) of FIG. 10 from the to-be-watermarked image signal 10 indicated by (a) of FIG. 10. The two phase shifters 32-1 and 32-2 phase-shift this specific frequency component signal by predetermined shift amounts. The EXOR gates 33-1 and 33-2 in FIG. 7 or the multipliers 37-1 and 37-2 in FIG. 8 multiply these phase shift signals by factors which express the 0th and 1st bits of the watermark information 14 (CCI), respectively. For example, if the watermark information 14 is "0", the phase shift signal is multiplied by −1; if it is "1", the phase shift signal is multiplied by +1. In FIG. 10, (c) and (d) respectively indicate phase shift signals output from the EXOR gates 33-1 and 33-2 or multipliers 37-1 and 37-2 when watermark information is (1, 1).

Furthermore, the multipliers 34-1 and 34-2 multiply the phase shift signals by an activity computed by the activity computation circuit 35 as needed. After that, the adder 36 adds the products to the to-be-watermarked image signal 10, thus generating the watermarked image signal 17 indicated by (e) of FIG. 10. The solid curve indicated by (e) of FIG. 10 represents the watermarked image signal 17, and a waveform indicated by (a) of FIG. 10 is obtained by mixing the to-be-watermarked image signal and the phase shift signals indicated by (c) and (d) in FIG. 10 by addition.

Figure 11:
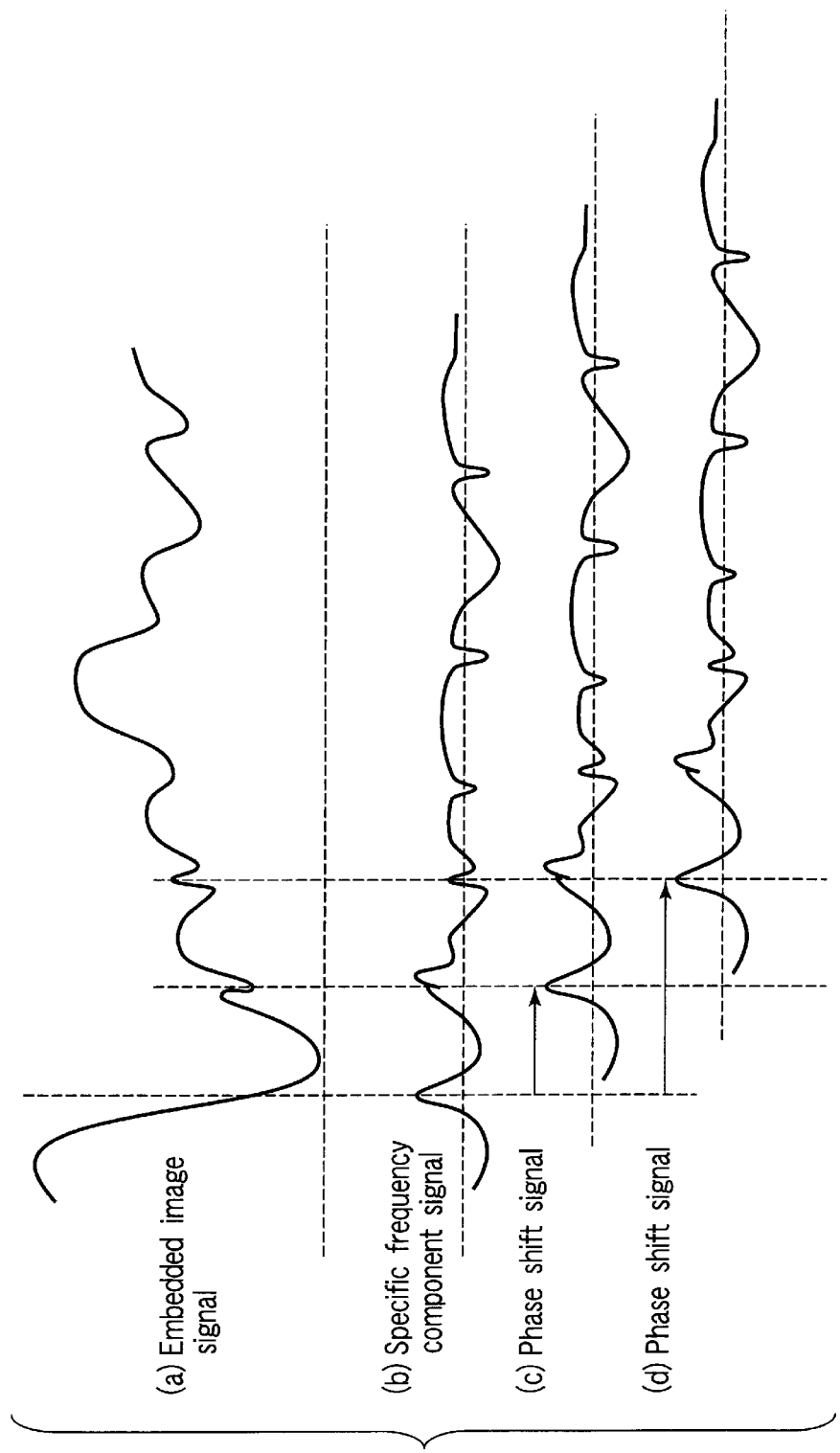
FIG. 11 is a waveform chart of respective signals, which shows the operation of the digital watermark detection apparatus shown in FIG. 9.

On the other hand, when watermark information is detected by the digital watermark detection apparatus shown in FIG. 9 from the watermarked image signal (e) embedded with the watermark information, as shown in FIG. 10, the high-pass filter 41 extracts a specific frequency component signal indicated by (b) of FIG. 11 from the watermarked image signal 20 indicated by (a) of FIG. 11 (corresponding to the watermarked image signal 17 indicated by (e) of FIG. 10). When the watermarked image signal 20 has not suffered any scaling, the phase shifters 42-1 and 42-2 phase-shift the watermarked image signal 20 by the same predetermined shift amounts as those of the phase shifters 32-1 and 32-2 in FIG. 7, as indicated by (c) and (d) of FIG. 11.

The first multipliers 43-1 and 43-2 multiply an activity in accordance with the phase shift signals indicated by (c) and (d) of FIG. 11. After that, the second multipliers 45-1 and 45-2 multiply the watermarked image signal 20 indicated by (a) of FIG. 11 by the outputs from the first multipliers 43-1 and 43-2. The cumulative adders 46-1 and 46-2 cumulatively add the products from the second multipliers 45-1 and 45-2. In this way, the cross-correlation values of the phase shift signals are obtained, and watermark information is determined from peaks of the cross-correlation values. For example, if the peak of the cross-correlation value is positive, it is determined that the watermark information is +1 ("1"); if the peak of the cross-correlation value is negative, it is determined that the watermark information is −1 ("0").

On the other hand, if the watermarked image signal 20 has suffered scaling, the phase shift amounts of the phase shifters 42-1 and 42-2 are controlled in the same manner as in FIG. 4 to search for phase shift amounts. That is, the CCI estimator 47 searches for peaks of the cross-correlation values upon controlling the phase shift amount, and estimates the watermark information 26 from the peak positions.

Figure 12:
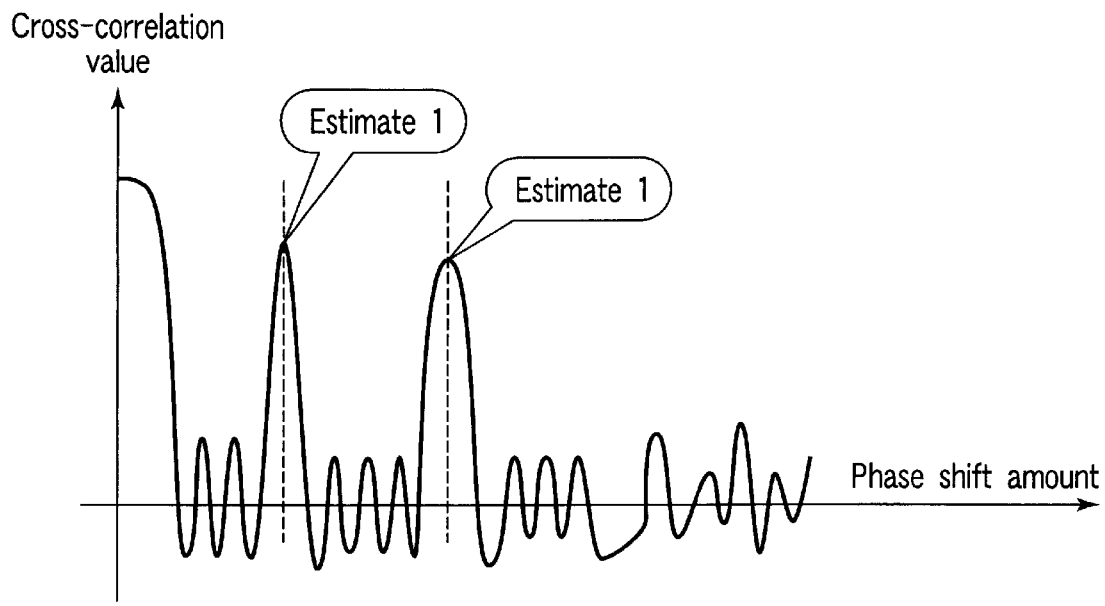
FIG. 12 is a graph showing the operation of peak search for a cross-correlation value and watermark information detection when watermark information in the digital watermark detection apparatus shown in FIG. 9 is (1, 1)

For example, if watermark information 14 (CCI) is (1, 1), two positive peaks of cross-correlation values are present in addition to the origin (a point where the phase shift amount is zero), as shown in FIG. 12, thus determining watermark information.

Figure 13:
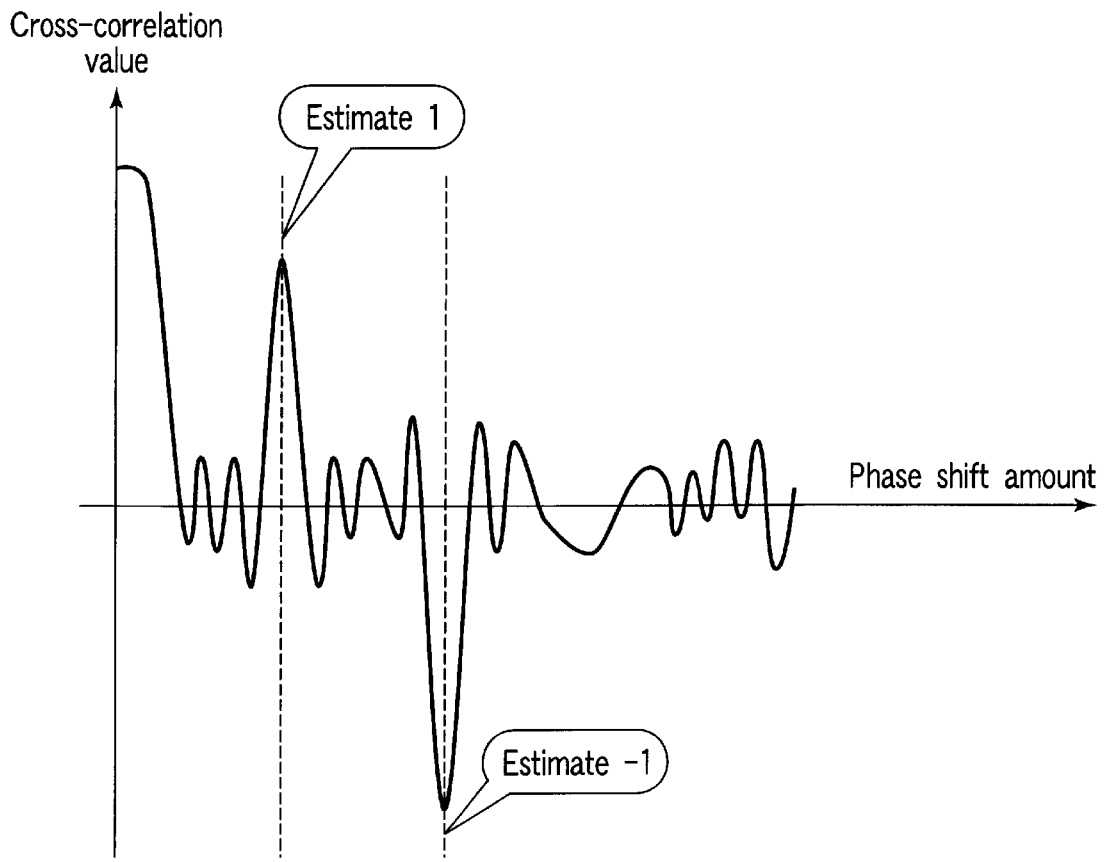
FIG. 13 is a graph showing the operation of peak search for a cross-correlation value and watermark information detection when watermark information in the digital watermark detection apparatus shown in FIG. 9 is (1, 1)

On the other hand, if the watermark information 14 (CCI) is (1, −1), a positive peak of a cross-correlation value is present at a position near the origin, and a negative peak is present at a position farther from the origin than the positive peak, as shown in FIG. 13, thus determining watermark information.

OPERATION EXAMPLE 2
Digital Watermark Embedding/Detection Apparatus

Another operation example of the digital watermark embedding apparatus in FIG. 7 or 8 and the digital watermark detection apparatus in FIG. 9 will be described below using FIGS. 14 to 18. In this method, the digital watermark embedding apparatus inverts the polarity of each phase shift signal by one of every line, every set of a plurality of lines, every field, every set of a plurality of fields, every frame, and every set of a plurality of frames, or appropriate combinations of them. An operation example when watermark information consists of 2 bits will be explained below.

Figure 14:
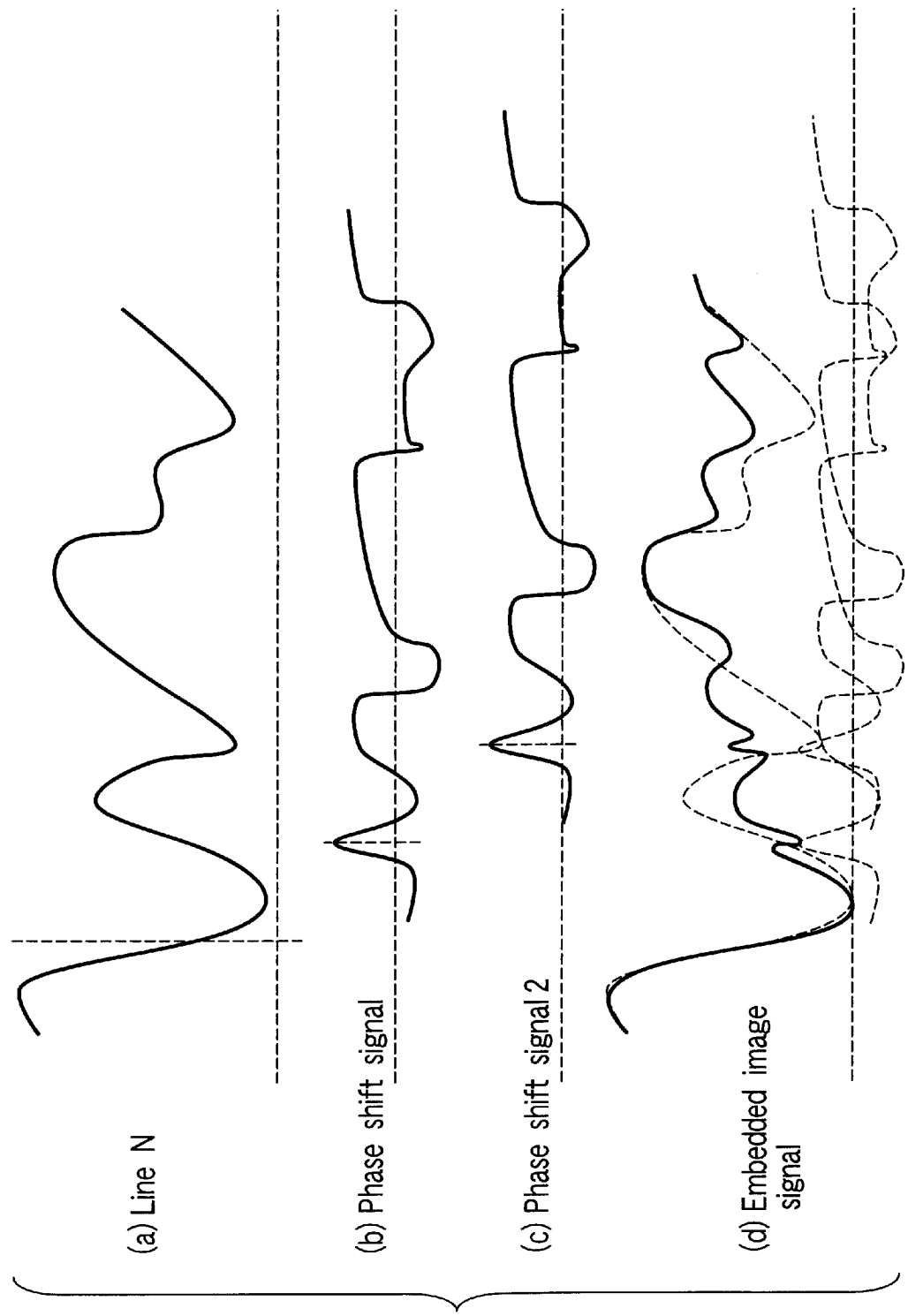
FIG. 14 is a waveform chart of respective signals, which shows the process of the digital watermark embedding apparatus shown in FIG. 7 or 8 for an image signal of the N-th line.

The digital watermark embedding apparatus executes a process shown in FIG. 14 for the N-th line (N=1, 2, . . . ) of the to-be-watermarked image signal 10.

The two phase shifters 32-1 and 32-2 phase-shift a specific frequency component signal, which is extracted by the high-pass filter 31 from the N-th line signal indicated by (a) of FIG. 14 of the to-be-watermarked image signal 10, by predetermined shift amounts. The EXOR gates 33-1 and 33-2 in FIG. 7 or the multipliers 37-1 and 37-2 in FIG. 8 respectively multiply these phase shift signals by factors which express the 0th and 1st bits of the watermark information 14 (CCI). For example, if the watermark information 14 is "0", the phase shift signal is multiplied by −1; if the watermark information is "1", the phase shift signal is multiplied by +1. In FIG. 14, (b) and (c) respectively indicate phase shift signals output from the EXOR gates 33-1 and 33-2 or multipliers 37-1 and 37-2 when watermark information is (1, 1).

Furthermore, the multipliers 34-1 and 34-2 multiply the phase shift signals by an activity computed by the activity computation circuit 35 as needed. After that, the adder 36 adds the products to the to-be-watermarked image signal 10. As a result, the to-be-watermarked image signal indicated by the broken curve in (d) of FIG. 14 (corresponding to waveform (a) of FIG. 14), and the phase shift signals indicated by (b) and (c) in FIG. 14 are mixed by addition, thus generating the watermarked image signal 17 indicated by the solid curve.

Subsequently, the digital watermark embedding apparatus executes a process shown in FIG. 15 for the (N+1)-th line of the to-be-watermarked image signal 10.

Figure 15:
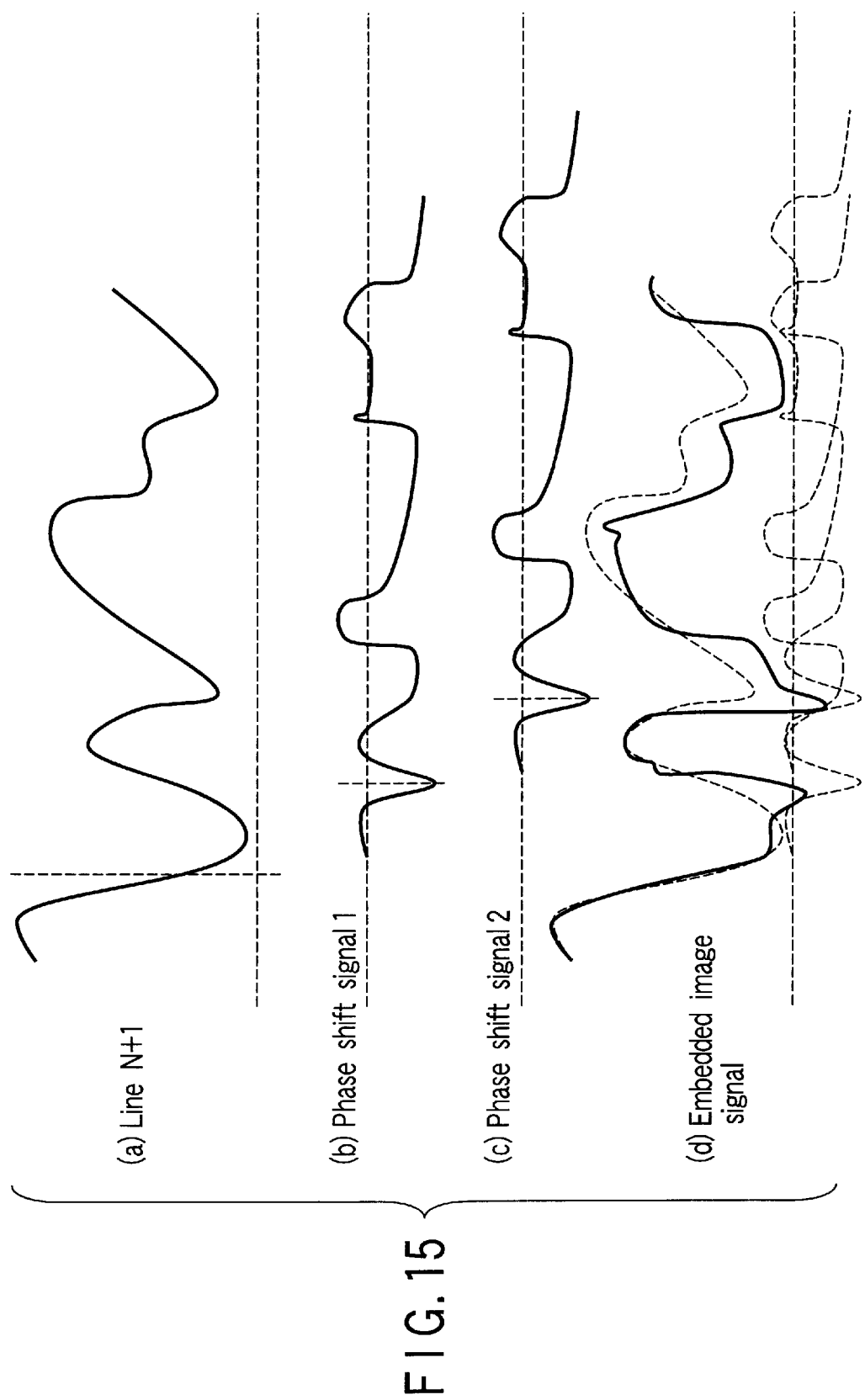
FIG. 15 is a waveform chart of respective signals, which shows the process of the digital watermark embedding apparatus shown in FIG. 7 or 8 for an image signal of the (N+1)-th line.

The two phase shifters 32-1 and 32-2 phase-shift a specific frequency component signal, which is extracted by the high-pass filter 31 from the (N+1)-th line signal indicated by (a) of FIG. 15 of the to-be-watermarked image signal 10, by predetermined shift amounts. The EXOR gates 33-1 and 33-2 in FIG. 7 or the multipliers 37-1 and 37-2 in FIG. 8 respectively multiply these phase shift signals by factors which express the 0th and 1st bits of the watermark information 14 (CCI). In this case, contrary to the case for the N-th line signal, for example, if the watermark information 14 is "0", the phase shift signal is multiplied by +1; if it is "1", the phase shift signal is multiplied by −1. Therefore, the polarities of the phase shift signals output from the EXOR gates 33-1 and 33-2 or multipliers 37-1 and 37-2 when the watermark information is (1, 1) are inverted, as indicated by (b) and (c) in FIG. 15, unlike the waveforms indicated by (b) and (c) of FIG. 14.

Furthermore, the multipliers 34-1 and 34-2 multiply the phase shift signals by an activity computed by the activity computation circuit 35 as needed. After that, the adder 36 adds the products to the to-be-watermarked image signal 10, thereby generating the watermarked image signal 17 indicated by the solid curve (in (d) of FIG. 15) obtained by mixing the to-be-watermarked image signal indicated by the broken curve in (d) of FIG. 15 (corresponding to waveform (a) of FIG. 15), and the phase shift signals indicated by (b) and (c) in FIG. 15 by addition.

In the above description, the polarities of the phase shift signals are inverted between the N-th and (N+1)-th lines of the to-be-watermarked image signal, i.e., every line, but may be inverted every set of a plurality of lines, every field, every set of a plurality of fields, every frame, or every set of a plurality of frames.

Figure 16:
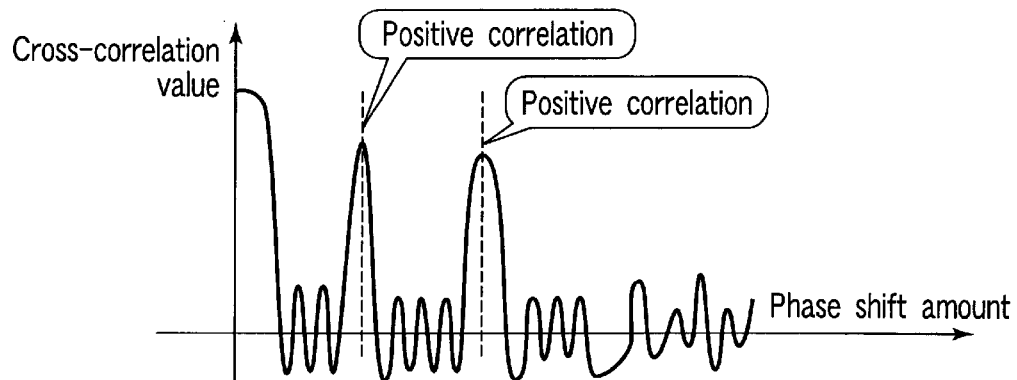
FIG. 16 is a graph for explaining cross-correlation values in the digital watermark detection apparatus shown in FIG. 9 with respect to a watermarked image signal obtained by the process shown in FIG. 14.
Figure 17:
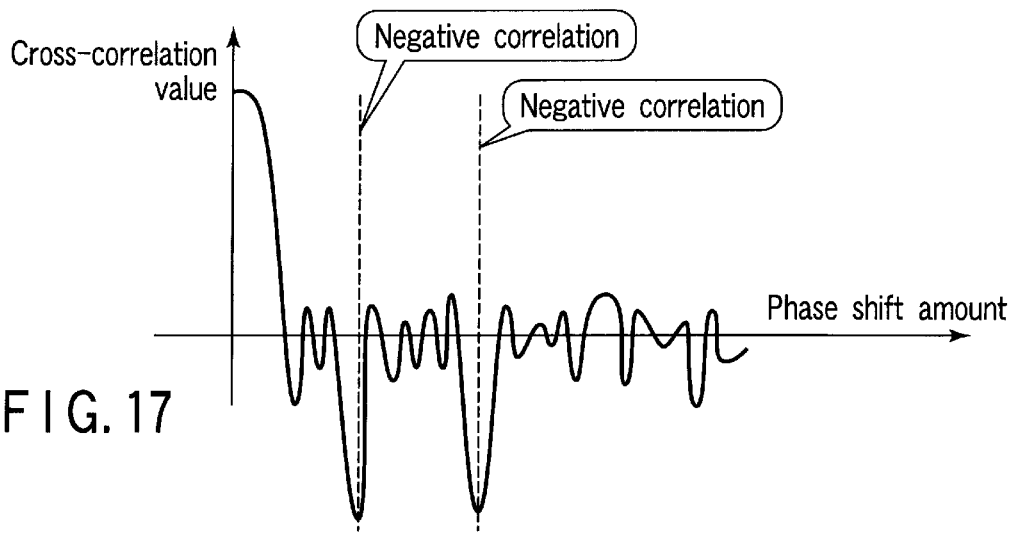
FIG. 17 is a graph for explaining cross-correlation values in the digital watermark detection apparatus shown in FIG. 9 with respect to a watermarked image signal obtained by the process shown in FIG. 15.
Figure 18:
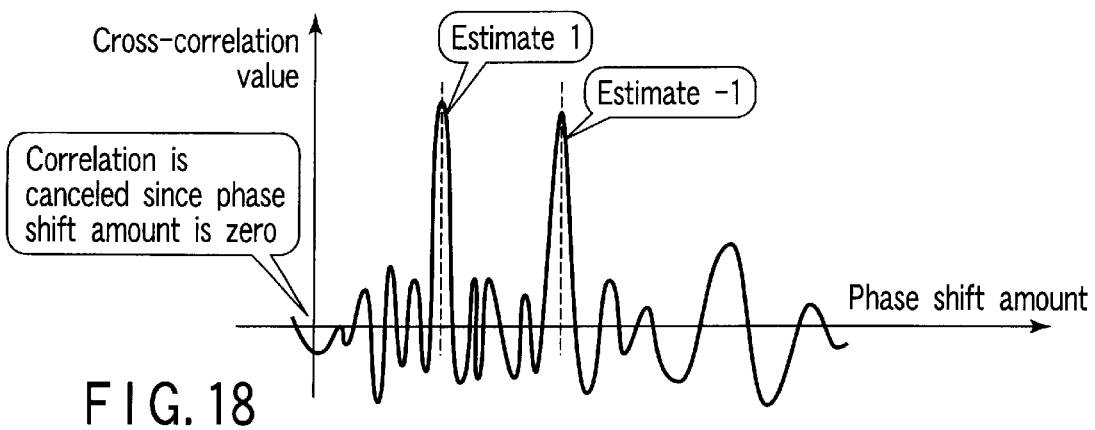
FIG. 18 is a graph showing the watermark information detection operation in the digital watermark detection apparatus shown in FIG. 9 with respect to a watermarked image signal obtained by the process shown in FIG. 15.

On the other hand, the digital watermark detection apparatus in FIG. 9 inverts the polarities upon cumulative addition as needed in correspondence with polarity inversion of the phase shift signals by one of every line, every set of a plurality of lines, every field, every set of a plurality of fields, every frame, and every set of a plurality of frames, or appropriate combinations of them. For example, when the polarities of the phase shift signals have been inverted every line, as has been explained using FIGS. 14 and 15, positive peaks of the cross-correlation values for the N-th line of the watermarked image signal 20 appear in correspondence with the phase shift amounts, as shown in FIG. 16. However, negative peaks of the cross-correlation values for the (N+1)-th line of the watermarked image signal 20 appear in correspondence with the phase shift amounts, as shown in FIG. 17. Hence, the polarities of the cross-correlation values output from the multipliers 45-1 and 45-2 are inverted every line, and these values are cumulatively added by the cumulative adders 46-1 and 46-2. In this case, since positive peaks of the cross-correlation values after cumulative addition appear successively, as shown in FIG. 18, it is determined that the watermark information is (1, 1).

In this way, polarity inversions of the phase shift signals are combined upon embedding watermark information, and the cross-correlation values are cumulatively added after their polarities are inverted accordingly. As a result, the watermark information can be rendered imperceptible on the image, and tampering of watermark information can be prevented more effectively.

OPERATION EXAMPLE 3
Digital Watermark Embedding/Detection Apparatus

A further operation example of the digital watermark embedding apparatus in FIG. 7 or 8 and the digital watermark detection apparatus in FIG. 9 will be described below using FIGS. 19 to 21. In this method, the digital watermark embedding apparatus inverts phase shift amounts in the right-and-left direction for every line, and an operation when watermark information consists of 2 bits will be explained below.

Figure 19:
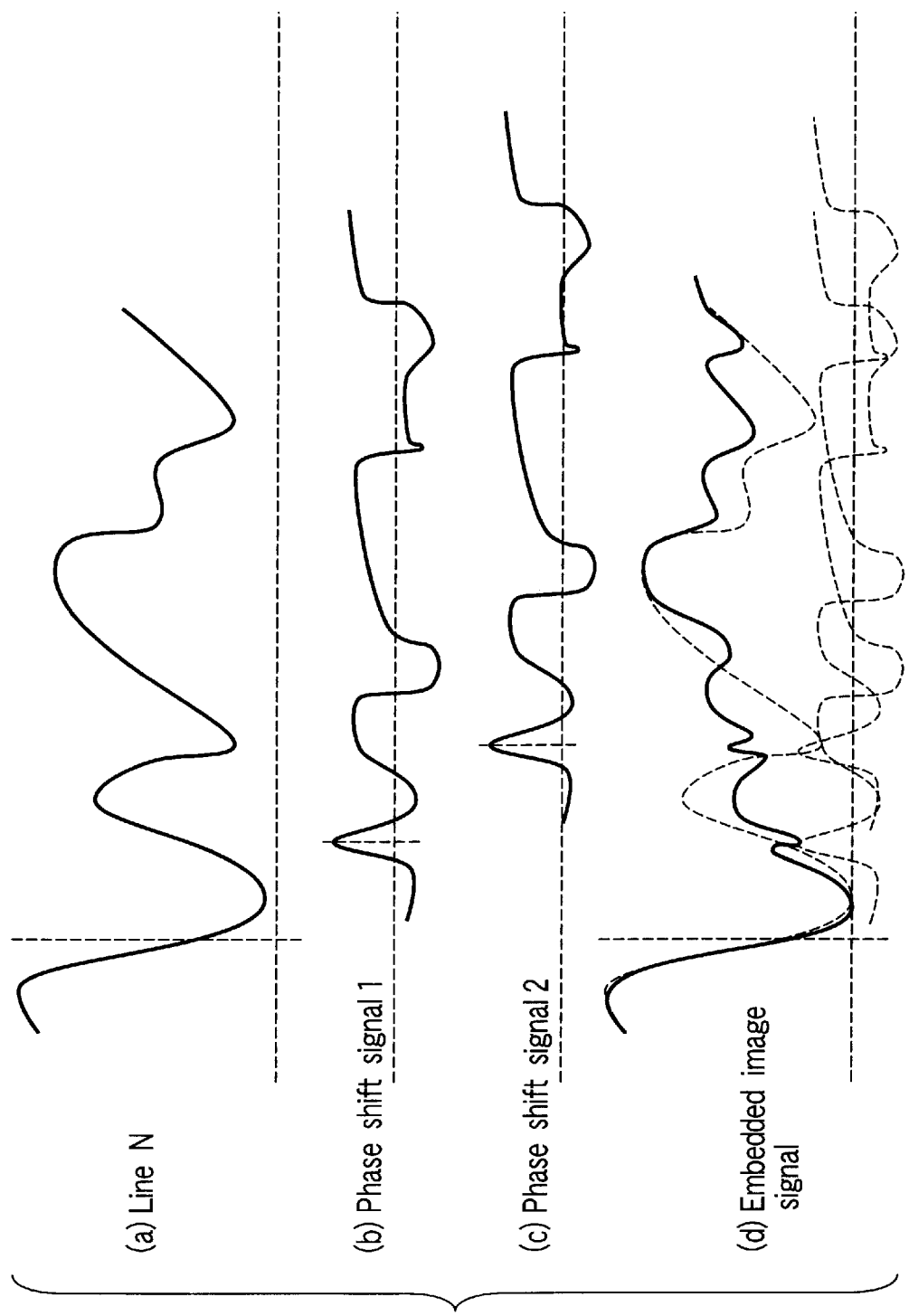
FIG. 19 is a waveform chart of respective signals, which shows another process of the digital watermark embedding apparatus shown in FIG. 7 or 8 for an image signal of the N-th line.

The digital watermark embedding apparatus executes a process shown in FIG. 19 for the N-th line (N=1, 2, ... ) of the to-be-watermarked image signal 10.

The two phase shifters 32-1 and 32-2 phase-shift a specific frequency component signal, which is extracted by the high-pass filter 31 from the N-th line signal indicated by (a) of FIG. 19 of the to-be-watermarked image signal 10, to the right, i.e., in a phase lead direction by predetermined shift amounts. The EXOR gates 33-1 and 33-2 in FIG. 7 or the multipliers 37-1 and 37-2 in FIG. 8 respectively multiply these phase shift signals by factors which express the 0th and 1st bits of the watermark information 14 (CCI) in the same manner as in the above description. In FIG. 19, (b) and (c) respectively indicate phase shift signals output from the EXOR gates 33-1 and 33-2 or multipliers 37-1 and 37-2 when watermark information is (1, 1).

Furthermore, the multipliers 34-1 and 34-2 multiply the phase shift signals by an activity computed by the activity computation circuit 35 as needed. After that, the adder 36 adds the products to the to-be-watermarked image signal 10. As a result, the to-be-watermarked image signal indicated by the broken curve in (d) of FIG. 19 (corresponding to waveform (a) of FIG. 19), and the phase shift signals indicated by (b) and (c) in FIG. 19 are mixed by addition, thus generating the watermarked image signal 17 with a waveform indicated by the solid curve.

Figure 20:
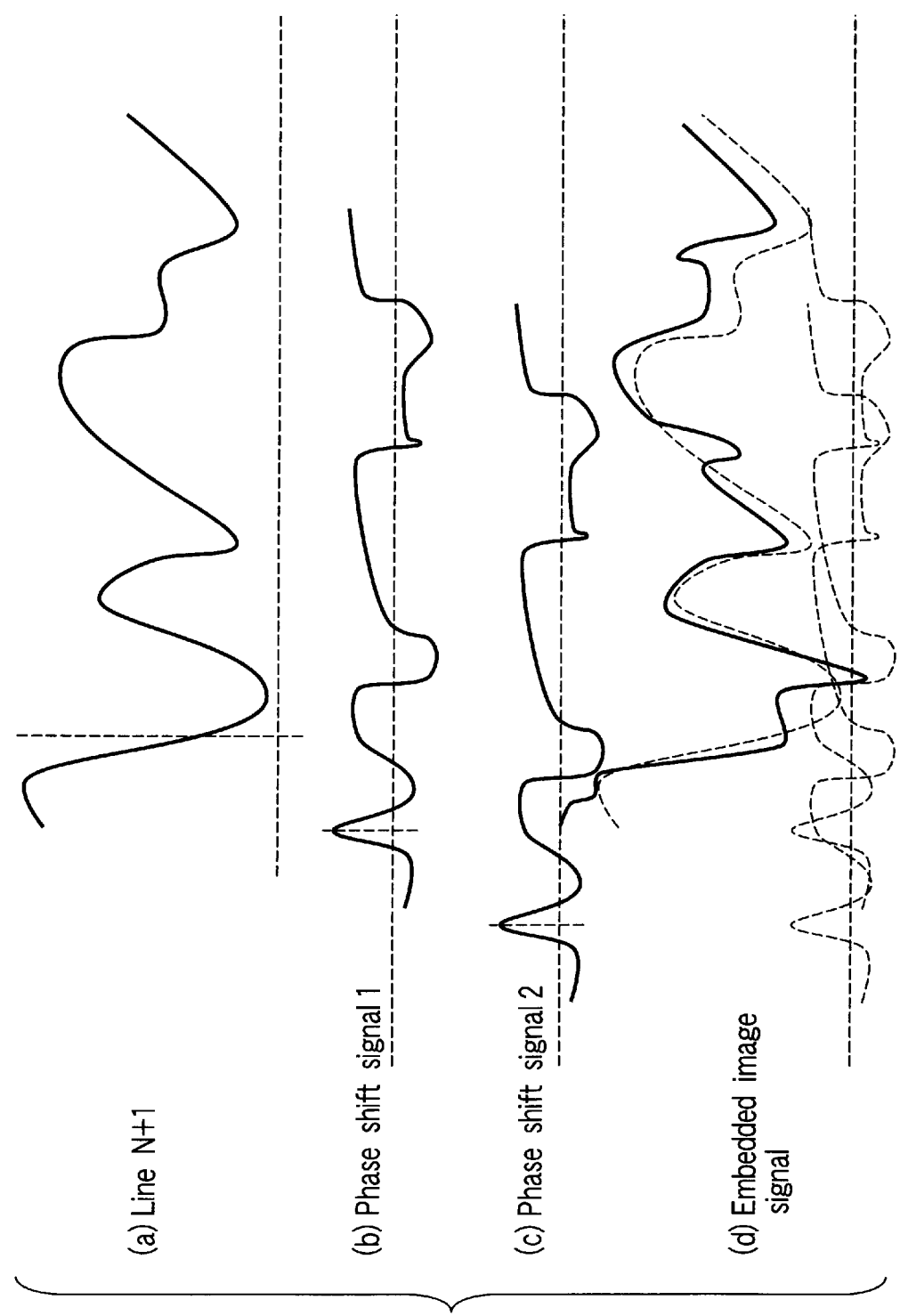
FIG. 20 is a waveform chart of respective signals, which shows another process of the digital watermark embedding apparatus shown in FIG. 7 or 8 for an image signal of the (N+1)-th line.

On the other hand, the digital watermark embedding apparatus executes a process shown in FIG. 20 for the (N+1)-th line of the to-be-watermarked image signal 10.

The two phase shifters 32-1 and 32-2 phase-shift a specific frequency component signal, which is extracted by the high-pass filter 31 from the N-th line signal indicated by (a) of FIG. 20 of the to-be-watermarked image signal 10, to the left, i.e., in a phase lag direction by predetermined shift amounts. The EXOR gates 33-1 and 33-2 in FIG. 7 or the multipliers 37-1 and 37-2 in FIG. 8 respectively multiply these phase shift signals by factors which express the 0th and 1st bits of the watermark information 14 (CCI) in the same manner as in the above description. In FIG. 20, (b) and (c) respectively indicate phase shift signals output from the EXOR gates 33-1 and 33-2 or multipliers 37-1 and 37-2 when watermark information is (1, 1).

Furthermore, the multipliers 34-1 and 34-2 multiply the phase shift signals by an activity computed by the activity computation circuit 35 as needed. After that, the adder 36 adds the products to the to-be-watermarked image signal 10. As a result, the to-be-watermarked image signal indicated by the broken curve in (d) of FIG. 20 (corresponding to waveform (a) of FIG. 20), and the phase shift signals indicated by (b) and (c) in FIG. 20 are mixed by addition, thus generating the watermarked image signal 17 with a waveform indicated by the solid curve.

On the other hand, the digital watermark detection apparatus in FIG. 9 simply cumulatively adds the cross-correlation values every line to search for peaks, thereby detecting watermark information. However, as described in operation example 2, when the polarities of the phase shift signals have been inverted by one of every line, every set of a plurality of lines, every field, every set of a plurality of fields, every frame, and every set of a plurality of frames, or appropriate combinations of them, polarity inversion is also made for each cumulative addition unit.

Figure 21:
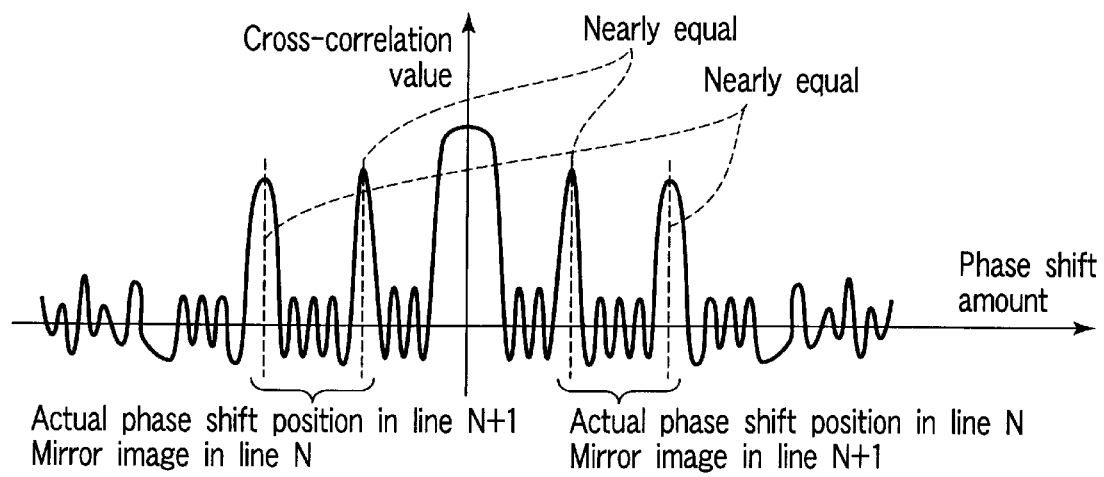
FIG. 21 is a graph for explaining cross-correlation values in the digital watermark detection apparatus shown in FIG. 9 with respect to a watermarked image signal obtained by the process shown in FIGS. 19 and 20.

FIG. 21 shows cross-correlation values after cumulative addition every line in this case. Upon searching for phase shift amounts by setting them in the positive and negative directions, cross-correlation values having nearly the same patterns, i.e., cross-correlation values ax-symmetrical about the center, can be obtained. By exploiting such a characteristic of the cross-correlation values, watermark information can be detected by conducting a search in only one direction (e.g., right direction).

OPERATION EXAMPLE 4
Digital Watermark Embedding/Detection Apparatus

A further operation example of the digital watermark embedding apparatus in FIG. 7 or 8 and the digital watermark detection apparatus in FIG. 9 will be described below using FIGS. 22 to 25. An example described below is a method of embedding a calibration signal together upon embedding watermark information, and using that calibration signal in detection of the watermark information. A practical operation example will be explained below.

(1) Upon embedding N-bit watermark information in an image signal, the digital watermark embedding apparatus generates (N+1)-bit phase shift signals, and embeds 1 bit other than N bits used to embed watermark information in each phase shift signal as a calibration signal, so that the 1 bit always has level +1 (or −1). This calibration signal serves as a reference upon detecting watermark information.

Figure 22:
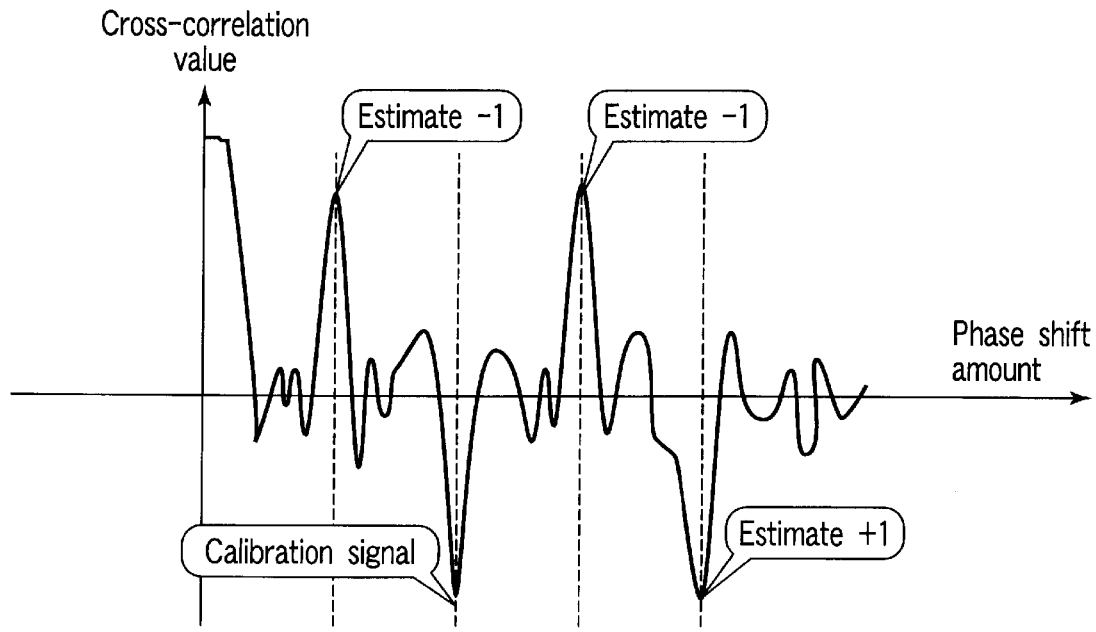
FIG. 22 is a graph showing the cross-correlation values and watermark detection operation in the digital watermark detection apparatus shown in FIG. 9 when the digital watermark embedding apparatus shown in FIG. 7 or 8 embeds a calibration signal together with watermark information.

On the other hand, the digital watermark detection apparatus detects watermark information based on correlation between the cross-correlation values at respective positions of phase shifts, and those corresponding to the calibration signal, since that correlation is known. For example, assuming that a calibration signal is embedded as level +1 (or −1) in each phase shift signal, it is estimated that information is +1 (or −1) when a cross-correlation value at a position corresponding to the calibration signal, and that at another embedded position have the same polarity, or it is estimated that information is −1 (or +1) when they have different polarities, as shown in FIG. 22.

(2) The digital watermark embedding apparatus may embed a calibration signal at a position where the phase shift amount is minimum or maximum. In such a case, the digital watermark detection apparatus detects the calibration signal at the position where the phase shift amount is minimum or maximum, and determines the embedded watermark information based on correlation between that calibration signal and watermark information.

(3) The digital watermark embedding apparatus embeds a calibration signal at a position where the phase shift amount is minimum or maximum as a predetermined value (e.g., +1 or −1), sets a plurality of phase shift amounts at equal intervals, and embeds ternary information {+1, 0, −1} at respective phase shift positions.

More specifically, for example, when ternary information is {+1}, a phase shift signal multiplied by a positive multiplier is added to the to-be-watermarked image signal 10; when ternary information is {−1}, a phase shift signal multiplied by a negative multiplier is added to the to-be-watermarked image signal 10; and when ternary information is {0}, nothing is added to the to-be-watermarked image signal 10.

Figures 23, 24, 25:
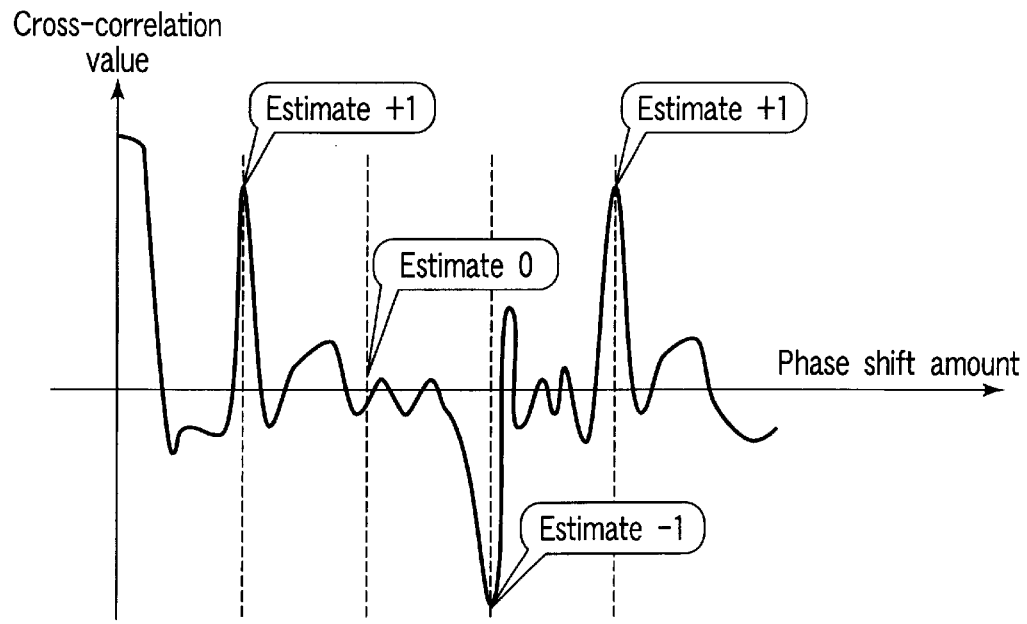
FIG. 23 is a graph showing another example of the cross-correlation values and watermark detection operation in the digital watermark detection apparatus shown in FIG. 9 when the digital watermark embedding apparatus shown in FIG. 7 or 8 embeds a calibration signal together with watermark information.
FIG. 24 shows a table which is watermark information in the digital watermark embedding apparatus shown in FIG. 7 or 8, and is used to encode a binary value into a ternary value.
FIG. 25 shows another table which is watermark information in the digital watermark embedding apparatus shown in FIG. 7 or 8, and is used to encode a binary value into a ternary value.

On the other hand, the digital watermark detection apparatus obtains cross-correlation values at the phase shift positions of the watermark information, which are estimated from the calibration signal. As shown in FIG. 23, when this cross-correlation value is in the neighborhood of zero, it is determined that ternary information is {0}; when the cross-correlation value is not in the neighborhood of zero, it is determined based on correlation between the cross-correlation value at the phase shift position of the watermark information and that of the calibration signal that ternary information is {+1, −1}. Application examples of operation example (3) will be described below.

(3-1) The digital watermark embedding apparatus encodes binary values to ternary values as watermark information, as shown in FIG. 24, and embeds these ternary values as ternary information, as described above.

The digital watermark detection apparatus decodes ternary values detected as ternary information, and detects watermark information of original binary values.

(3-2) As in the above example, the digital watermark embedding apparatus encodes binary values to ternary values as watermark information, and embeds these ternary values as ternary information, as described above. In this case, a combination of all "0"s is not used as information to be embedded, as shown in FIG. 25.

The digital watermark detection apparatus decodes ternary values detected as ternary information, and detects watermark information of original binary values.

(3-3) A ternary value is used as a carry for CCI.

(3-4) Watermark information is embedded and detected while setting Copy Free (can be copied unlimitedly) to be +1, Copy Once (can be copied only once) to be 0, and Never Copy (cannot be copied) to be −1. In this case, since −1 is embedded at a position of "0" in Remark of watermark information, the need for cancel can be obviated.

OPERATION EXAMPLE 5
Digital Watermark Embedding/Detection Apparatus

Figure 26:
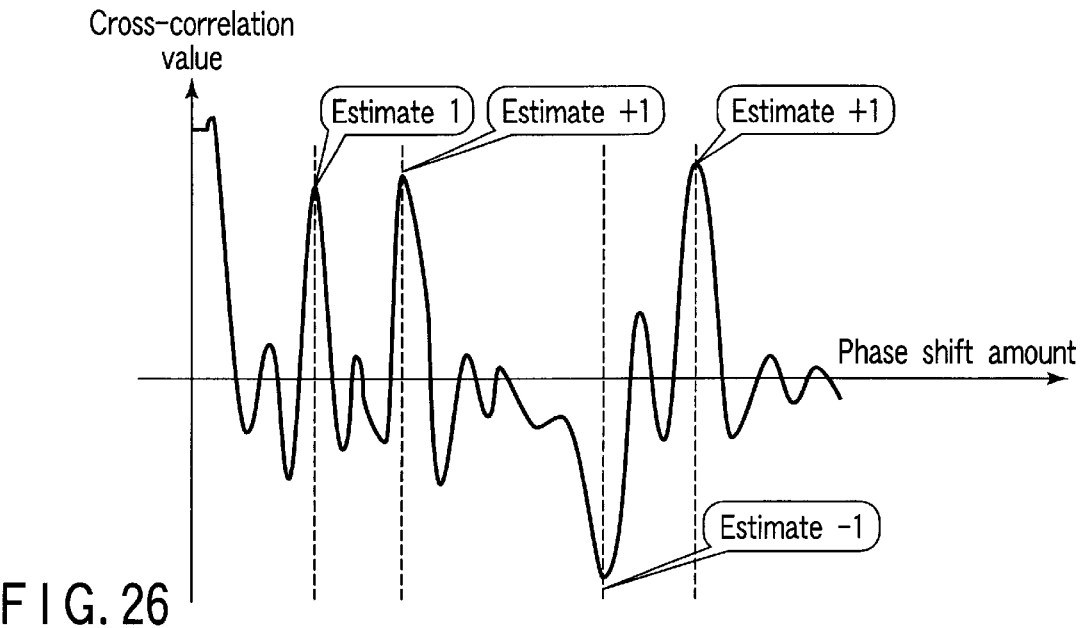
FIG. 26 is a graph showing the watermark information detection operation in the digital watermark detection apparatus shown in FIG. 9 when a plurality of phase shift amounts are set to have arbitrary intervals while maintaining a correlation relationship in the digital watermark embedding apparatus shown in FIG. 7 or 8.

A further operation example of the digital watermark embedding apparatus in FIG. 7 or 8 and the digital watermark detection apparatus in FIG. 9 will be described below. The digital watermark embedding apparatus sets a plurality of phase shift amounts at arbitrary intervals without disturbing their correlation. In this case, the digital watermark detection apparatus counts the number of peaks of cross-correlation values, and determines in such a manner that the innermost peak, which is closest to the origin, is bit 0, the next innermost peak is bit 1, . . . , as shown in FIG. 26.

OPERATION EXAMPLE 6
Digital Watermark Embedding/Detection Apparatus

Figure 27:
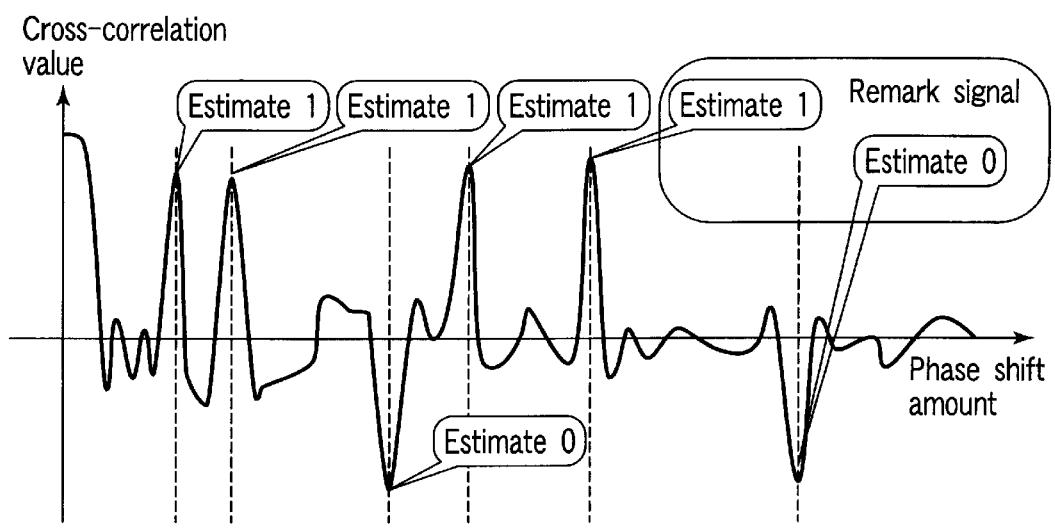
FIG. 27 is a graph showing the watermark information detection operation in the digital watermark detection apparatus shown in FIG. 9 when remark information is additionally written in the digital watermark embedding apparatus shown in FIG. 7 or 8.

A further operation example of the digital watermark embedding apparatus in FIG. 7 or 8 and the digital watermark detection apparatus in FIG. 9 will be described below using FIG. 27. The digital watermark embedding apparatus detects the outermost one of existing embedded positions where watermark information is embedded, and additionally writes information for Remark outside the detected position.

On the other hand, the digital watermark detection apparatus searches until all peaks of cross-correlation values are found, and determines information after Remark based on information embedded at the outermost position.

OPERATION EXAMPLE 7
Digital Watermark Embedding/Detection Apparatus

The operations of the digital watermark embedding apparatus in FIG. 1 upon controlling the phase controller 12 using the watermark information 14, and the digital watermark detection apparatus shown in FIG. 3 or 4 will be described below.

The phase controller 12 comprises, e.g., four phase shifters having different phase shift amounts, and a switch used to select these phase shifters. Assume that a specific frequency component signal from the specific frequency component extraction unit 11 is in parallel input to these phase shifters. If $\theta 1$, $\theta 2$, $\theta 3$, and $\theta 4$ respectively represent the phase shift amounts of the four phase shifters, for example, the 0th bit of the watermark information 14 is expressed by the presence/absence of superposition between specific frequency component signals which have been phase-shifted by the shift amounts $\theta 1$ and $\theta 2$. The 1st bit of the watermark information 14 is expressed by the presence/absence of superposition between specific frequency component signals which have undergone phase shifts of the shift amounts $\theta 3$ and $\theta 4$. More specifically, the specific frequency component signal is superposed on the to-be-watermarked image signal 10 in accordance with a combination of (a-1) and (a-2) or a combination of (b-1) and (b-2), explained below.

(a-1) If the 0th bit="1", only a specific frequency component signal which has been phase-shifted by $\theta 1$ is superposed on the to-be-watermarked image signal, and a specific frequency component signal which has been phase-shifted by $\theta 2$ is not superposed on the to-be-watermarked image signal.

(a-2) If the 1st bit="1", only a specific frequency component signal which has been phase-shifted by $\theta 3$ is superposed on the to-be-watermarked image signal, and a specific frequency component signal which has been phase-shifted by θ4 is not superposed on the to-be-watermarked image signal.

(b-1) If the 0th bit="1", only a specific frequency component signal which has been phase-shifted by θ1 is superposed on the to-be-watermarked image signal, and a specific frequency component signal which has been phase-shifted by θ2 is not superposed on the to-be-watermarked image signal.

(b-2) If the 1st bit="1", only a specific frequency component signal which has been phase-shifted by θ4 is superposed on the to-be-watermarked image signal, and a specific frequency component signal which has been phase-shifted by θ3 is not superposed on the to-be-watermarked image signal.

On the other hand, if scaling of the input watermarked image signal 20 is not considered, the digital watermark detection apparatus shown in FIG. 3 sets the same phase shift amounts of four phase shifters, which form the phase controller 22, as the phase shift amounts θ1, θ2, θ3, and θ4 of the phase controller 12 in the digital watermark embedding apparatus, and determines watermark information on the basis of cross-correlation values at the phase shift amounts θ1, θ2, θ3, and θ4.

Figure 28:
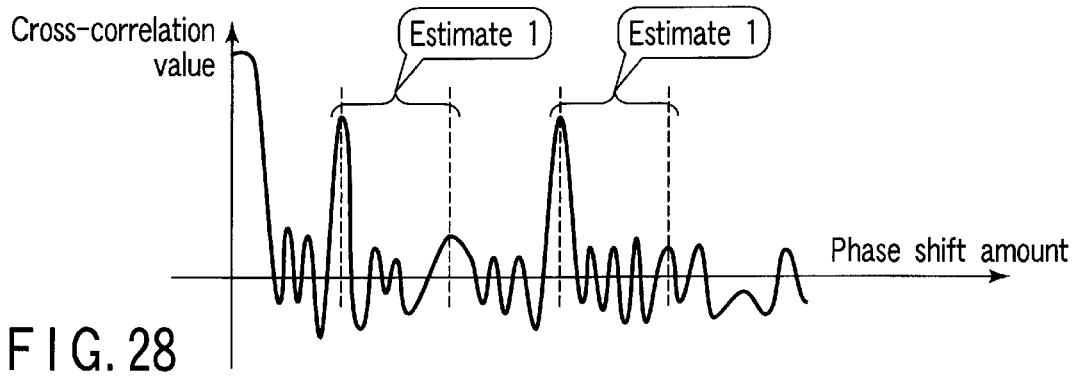
FIG. 28 is a graph showing the watermark information detection operation in the digital watermark detection apparatus shown in FIG. 3 when watermark information (1, 1) is embedded depending on whether or not to superpose a specific frequency component signal, which has undergone fixed phase shift by four phase shifters, in the digital watermark embedding apparatus shown in FIG. 1.

FIG. 28 shows cross-correlation values when watermark information is (1, 1), and FIG. 29 shows cross-correlation values when watermark information is (1, −1). The watermark information can be determined based on the cross-correlation values at the positions of the phase shift amounts θ1, θ2, θ3, and θ4.

When scaling of the watermarked image signal 20 is taken into consideration, the phase shift amounts given by the digital watermark embedding apparatus can be searched for by changing the phase shift amount, and the cross-correlation values can be determined.

Second Embodiment

Another embodiment of the present invention will be described below using FIGS. 30 to 33. In this embodiment, an amplitude limiter is inserted in a digital watermark embedding apparatus and digital watermark detection apparatus. The amplitude limiter limits the amplitude of a signal to be superposed on the to-be-watermarked image signal 10. With this process, watermark information is evenly embedded over a broad level range from the low to high levels of the to-be-watermarked image signal 10. As a result, the image quality can be prevented from deteriorating more effectively.

In a digital watermark embedding apparatus shown in FIG. 30, an amplitude limiter 18 is inserted between the specific frequency component extraction unit 11 and phase & amplitude controller (phase controller 12 in this example). In a digital watermark detection apparatus shown in FIG. 31, an amplitude limiter 28 is inserted between the specific frequency component extraction unit 21 and controller (phase controller 22 in this example) in correspondence with FIG. 30.

In a digital watermark embedding apparatus shown in FIG. 32, an amplitude limiter 18 is inserted between the phase & amplitude controller (amplitude controller 13 in this example) and watermark information superposition unit 16. In a digital watermark detection apparatus shown in FIG. 33, an amplitude limiter 28 is inserted between the phase & amplitude controller (amplitude controller 23 in this example) and correlation computation unit 25 in correspondence with FIG. 32.

Third Embodiment

A further embodiment of the present invention will be described below using FIGS. 34 to 42. This embodiment embeds and detects watermark information depending on randomizing information. With this process, watermark information cannot be detected unless randomizing information is known. As a result, digital watermarking more robust against attacks can be provided.

The randomizing information may be generated inside the digital watermark embedding apparatus or detection apparatus, or may be input from an external apparatus as long as the security can be assured. The randomizing information may be constant or may be changed during a digital watermark embedding process or detection process. For example, randomizing information may be changed in such a manner that different pieces of randomizing information are used in the left half (former half of one horizontal scanning period) and right half (latter half of one horizontal scanning period) in one line of an image signal, or different pieces of randomizing information are used every line.

In an example of a digital watermark embedding apparatus shown in FIG. 34, when a filter which forms the specific frequency component extraction unit 11 has different characteristics depending parameters, the parameters are given using secret randomizing information 19.

Figure 35:
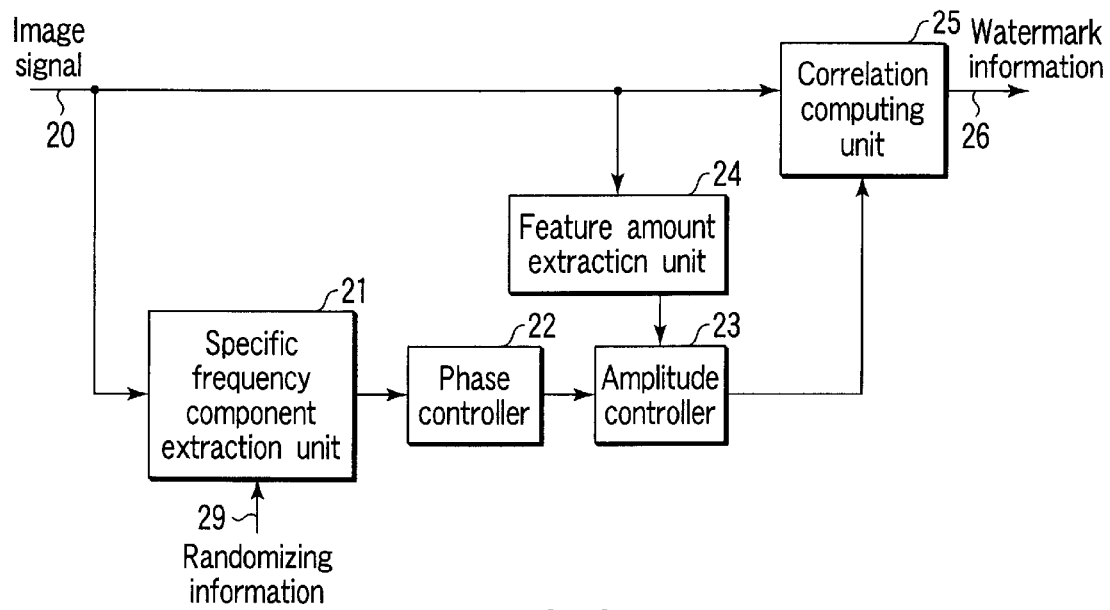
FIG. 35 is a block diagram showing the basic arrangement of a digital watermark detection apparatus using randomizing information according to the embodiment of the present invention.

In a digital watermark detection apparatus shown in FIG. 35, parameters of a filter, which forms the specific frequency component extraction unit 21, are given using randomizing information 29 in correspondence with FIG. 34. The randomizing information 29 is the same as the randomizing information 19 used in the digital watermark embedding apparatus in FIG. 34. Only the digital watermark detection apparatus which can internally generate or externally receive this randomizing information 29 can normally detect watermark information 26.

Figure 36:
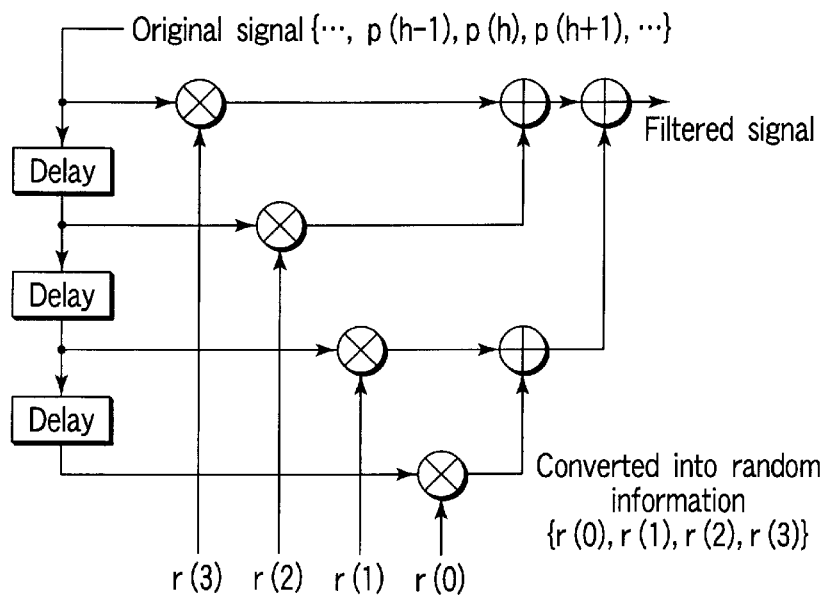
FIG. 36 is a block diagram showing an example of the detailed arrangement of a specific frequency component extraction unit in FIGS. 34 and 35.

FIGS. 36 and 37 show examples of filters used in the specific frequency component extraction units 11 and 21 in FIGS. 34 and 35. This filter multiplies successive pixel values { ... p(h−1), p(h), p(h+1), ... } of a to-be-watermarked image signal by coefficients, and calculates the sum of these products as a filter output. Since the coefficients can be randomized within a given range, these coefficients are used as the randomizing information 19.

In a digital watermark embedding apparatus shown in FIG. 38, phase shift amounts of phase shifters, which form the phase controller 12, are randomized in accordance with the randomizing information 19. In this manner, the peak pattern of an autocorrelation value is blunted to make the peak harder to see. In this case, it is desirable to frequently change the randomized phase shift amount. For example, different phase shift amounts are set in the left and right halves of a frame. Also, a frame may be divided into a plurality of strip-shaped regions extending in the vertical direction, and different phase shift amounts may be set for respective regions.

In a digital watermark detection apparatus shown in FIG. 39, phase shift amounts of phase shifters, which form the phase controller 22, are randomized in accordance with the randomizing information 29 in correspondence with the digital watermark embedding apparatus shown in FIG. 38. The randomizing information 29 is the same as the randomizing information 19 used in the digital watermark embedding apparatus in FIG. 38. Only the digital watermark detection apparatus which can internally generate or externally receive this randomizing information 29 can normally detect watermark information 26.

FIG. 40 shows an example of a phase shifter which is used in the phase controllers 11 and 21 in FIGS. 38 and 39, and has a variable phase shift amount. This phase shifter has an arrangement in which a plurality of phase shift elements are connected in series, and signals from respective taps (inputs/outputs of phase shift elements) are selected by a selector in accordance with randomizing information.

In a digital watermark embedding apparatus shown in FIG. 41, an amplitude modulator 51 is inserted between the phase & amplitude controller (amplitude controller 13 in this example) and watermark information superposition unit 16, and modulates the amplitude of an embedding signal in accordance with randomizing information 19.

In a digital watermark detection apparatus shown in FIG. 42, an amplitude modulator 61 is inserted between the phase & amplitude controller (amplitude controller 23 in this example) and correlation computation unit 25 in correspondence with the digital watermark embedding apparatus in FIG. 41, and modulates the amplitude of an embedding signal in accordance with randomizing information 29. The randomizing information 29 is the same as the randomizing information 19 used in the digital watermark embedding apparatus in FIG. 41. Only the digital watermark detection apparatus which can internally generate or externally receive this randomizing information 29 can normally detect watermark information 26.

In a digital watermark embedding apparatus shown in FIG. 43, a nonlinear filter 52 is inserted between the phase & amplitude controller (amplitude controller 13 in this example) and watermark information superposition unit 16. The nonlinear filter 52 reduces correlation between an embedding signal and to-be-watermarked image signal 10, thus preventing peaks from appearing in autocorrelation values.

Figure 44:
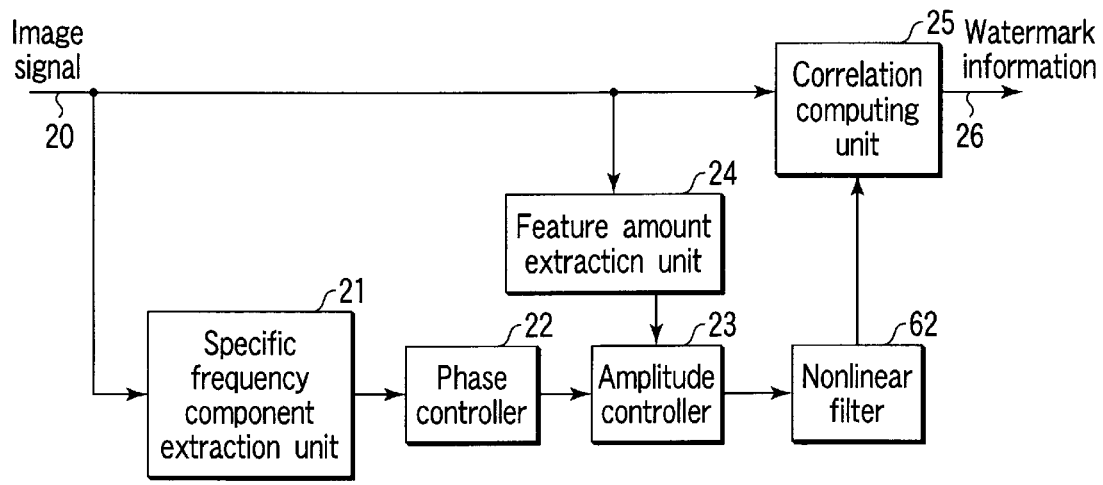
FIG. 44 is a block diagram showing the basic arrangement of a digital watermark detection apparatus using randomizing information according to the embodiment of the present invention.

In a digital watermark detection apparatus shown in FIG. 44, a linear filter 62, which has characteristics opposite to those of the linear filter 52 used in the digital watermark embedding apparatus in FIG. 43, is inserted between the phase & amplitude controller (amplitude controller 23 in this example) and correlation computation unit 25 in correspondence with the digital watermark embedding apparatus in FIG. 43.

As the nonlinear filter 52, a filter that uses amplitude modulation based on a trigonometric function or an equation of higher degree can be used. This filter is a nonlinear filter that outputs sin(x), x2, or the like if an input signal is x. FIG. 45 shows an example of the nonlinear filter 52.

Figure 45A:
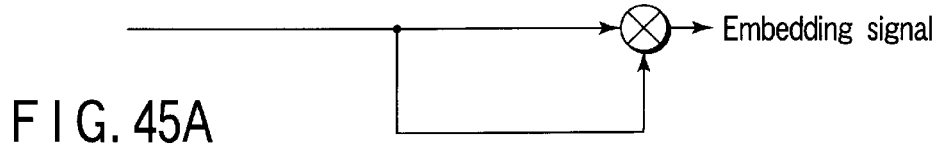
FIGS. 45A and 45B are block diagrams showing examples of the detailed arrangement of a nonlinear filter in FIGS. 43 and 44.
Figure 45B:
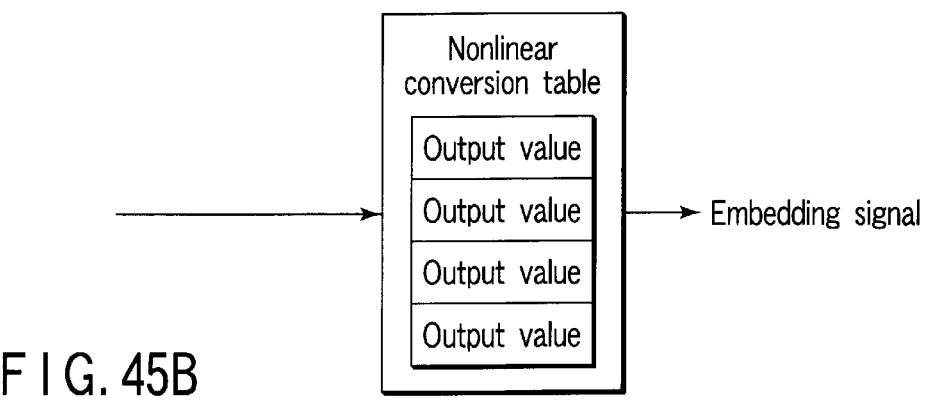

FIG. 45A shows a multiplication device which is formed by giving an identical input signal to two inputs of a multiplier, and outputs x2 when an input signal is x. An overflow part as a result of calculating a square is removed. FIG. 45B shows a nonlinear filter which implements the relationship between the input and output values in the form of a table so as to be able to express complicated nonlinear conversion. For example, if this nonlinear conversion table is a sin table, a nonlinear filter which outputs sin(ax) in response to an input signal x can be implemented.

As described above, according to the present invention, since a specific frequency component signal is extracted from an input image signal, at least one of the phase and amplitude of this specific frequency component signal is controlled in accordance with watermark information, and an image signal embedded with the watermark information can be generated by superposing the specific frequency component signal, at least one of the phase and amplitude of which has been controlled, on the input image signal, a digital watermark embedding method and apparatus, and a digital watermark detection method and apparatus, which are effective in preventing illegal copies of digital moving image signals provided via, e.g., recording media can be implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark embedding method of embedding watermark information in an image signal, comprising:

extracting a specific frequency component signal from the input image signal, wherein extraction, of the specified frequency component signal is randomized;

limiting an amplitude of the specific frequency component signal;

controlling at least one of a phase and amplitude of the specific frequency component signal in accordance with the watermark information; and outputting an image signal embedded with the watermark information by superposing the specific frequency component signal, at least one of the phase and amplitude of which has been controlled, on the input image signal, and subjecting the specific frequency component signal, at least one of the phase and amplitude of which has been controlled, to a nonlinear process, and superposing the specific frequency component signal processed on the image input signal.

2. A digital watermark detection method comprising:

extracting a specific frequency component signal from an input image signal in which watermark information is embedded;

limiting an amplitude of the specific frequency component signal;

randomizing the specific frequency component signal extracted;

controlling at least one of a phase and amplitude of the specific frequency component signal extracted, to obtain a controlled specific frequency component signal;

performing a correlation operation between the controlled specific frequency component signal and the input image signal to extract the watermark information;

subjecting the controlled specific frequency component signal to a nonlinear process; and performing the correlation operation between the image input signal and the controlled specific frequency component signal subjected to the nonlinear process.

3. A digital watermark embedding apparatus which embeds watermark information in an input image signal, comprising:

an extraction unit configured to extract a specific frequency component signal from the input image signal;

a control unit configured to control at least one of a phase and amplitude of the extracted specific frequency component signal in accordance with the watermark information, wherein a characteristic of at least one of the extraction unit and the control unit is randomized using randomizing information;

a superposing unit configured to superpose the specific frequency component signal, at least one of the phase and amplitude of which has been controlled by the control unit, on the input image signal to output an image signal embedded with the watermark information;

an amplitude limiter which is inserted between the extraction unit and the superposing unit and limits an amplitude of the specific frequency signal; and a nonlinear filter inserted between the control unit and the superposing unit.

4. A digital watermark detection apparatus which detects watermark information embedded in an input image signal, comprising:

an extraction unit configured to extract a specific frequency component signal from the input image signal;

a control unit configured to control at least one of a phase and amplitude of the specific frequency component signal extracted, wherein a characteristic of at least one of the extraction unit and the control unit is randomized using randomizing information;

a correlation computing unit configured to perform a correlation operation between the specific frequency component signal, at least one of the phase and amplitude of which has been controlled by the control unit, and the input image signal, to extract the watermark information;

an amplitude limiter which is inserted between the extraction unit and the correlation computing unit and limits an amplitude of the specific frequency component signal; and a nonlinear filter inserted between the control unit and the correlation computing unit.

5. A digital watermark embedding apparatus comprising:

extraction means for extracting a specific frequency component signal from an input image signal;

control means for controlling at least one of a phase and amplitude of the extracted specific frequency component signal in accordance with watermark information;

superposing means for superposing the specific frequency component signal, at least one of the phase and amplitude of which has been controlled by the control means, on the input image signal so as to output an image signal embedded with the watermark information; and a nonlinear filter inserted between the control means and the superposing means.

* * * * *